(12) United States Patent
Etches et al.

(10) Patent No.: US 12,340,183 B2
(45) Date of Patent: Jun. 24, 2025

(54) AUTOMATION-ENHANCED TRANSLATION WORKFLOW

(71) Applicant: IQVIA Inc., Parsippany, NJ (US)

(72) Inventors: Robert Etches, Vejle (DK); Jaromir Dzialo, Cracow (PL)

(73) Assignee: IQVIA Inc., Parsippany, NJ (US)

( * ) Notice: Subject to any disclaimer, the term of this patent is extended or adjusted under 35 U.S.C. 154(b) by 171 days.

(21) Appl. No.: 17/728,561

(22) Filed: Apr. 25, 2022

(65) Prior Publication Data

US 2022/0343085 A1 Oct. 27, 2022

Related U.S. Application Data

(60) Provisional application No. 63/178,766, filed on Apr. 23, 2021, provisional application No. 63/178,707, filed on Apr. 23, 2021, provisional application No. 63/178,704, filed on Apr. 23, 2021, provisional application No. 63/178,771, filed on Apr. 23, 2021,
(Continued)

(51) Int. Cl.
*G06F 40/51* (2020.01)
*G06F 18/22* (2023.01)
*G06F 40/279* (2020.01)
*G06F 40/47* (2020.01)
*G06F 40/58* (2020.01)

(52) U.S. Cl.
CPC ............ *G06F 40/51* (2020.01); *G06F 18/22* (2023.01); *G06F 40/279* (2020.01); *G06F 40/47* (2020.01); *G06F 40/58* (2020.01)

(58) Field of Classification Search
CPC ........ G06F 40/51; G06F 40/279; G06F 40/47; G06F 40/58
See application file for complete search history.

(56) References Cited

U.S. PATENT DOCUMENTS 6,857,022 B1 * 2/2005 Scanlan ................. G06F 40/58
704/7
9,473,437 B1 * 10/2016 Jakobsson ........... H04L 63/1491
(Continued)

OTHER PUBLICATIONS

Pourmajidi, William, and Andriy Miranskyy. "Logchain: Blockchain-assisted Log Storage." arXiv preprint arXiv:1805.08868 (2018). (Year: 2018).*
(Continued)

*Primary Examiner* — Brian L Albertalli
(74) *Attorney, Agent, or Firm* — Fish & Richardson P.C.

(57) ABSTRACT

A method is described that includes receiving a request to translate source content from a first language to a second language. The method includes processing the source content to generate first anonymized content by automatically anonymizing confidential information in the source content. The method also includes providing the first anonymized content to a first service provider to provide anonymization input and processing the first anonymized content with the anonymization input to generate second anonymized content. The method further includes obtaining a machine translation of the second anonymized content from the first language to the second language and providing the machine translation to a second service provider to provide translation input. The method further includes processing the machine translation with the translation input to generate translated content.

29 Claims, 15 Drawing Sheets

Related U.S. Application Data provisional application No. 63/178,702, filed on Apr. 23, 2021.

(56) References Cited

U.S. PATENT DOCUMENTS

| | | | | |
|---|---|---|---|---|
| 10,331,793 | B2* | 6/2019 | Dotterer | G06F 40/47 |
| 10,755,177 | B1 | 8/2020 | Dabney et al. | |
| 12,223,259 | B1* | 2/2025 | Sembium Varadarajan | G06N 20/00 |
| 2002/0026308 | A1 | 2/2002 | Osborne | |
| 2005/0086044 | A1* | 4/2005 | Hess | G06F 40/58 704/2 |
| 2006/0200339 | A1* | 9/2006 | Satake | G06F 40/55 704/4 |
| 2007/0030528 | A1* | 2/2007 | Quaeler | G06F 16/33 358/448 |
| 2007/0050182 | A1* | 3/2007 | Sneddon | G06F 40/51 704/2 |
| 2007/0294076 | A1* | 12/2007 | Shore | G06F 40/47 704/2 |
| 2008/0114564 | A1 | 5/2008 | Ihara | |
| 2009/0119091 | A1* | 5/2009 | Sarig | G06F 40/47 704/277 |
| 2011/0060627 | A1* | 3/2011 | Piersol | G06Q 30/02 705/26.7 |
| 2011/0184722 | A1* | 7/2011 | Sneddon | G06Q 10/06 704/7 |
| 2013/0004075 | A1* | 1/2013 | Avrahami | H04L 9/085 715/255 |
| 2013/0173247 | A1* | 7/2013 | Hodson | G06F 40/45 704/4 |
| 2014/0149363 | A1* | 5/2014 | Leeds | G06F 16/2365 707/691 |
| 2014/0280173 | A1* | 9/2014 | Scholtes | G06F 16/93 707/740 |
| 2014/0358518 | A1* | 12/2014 | Wu | G06F 40/47 704/3 |
| 2015/0193850 | A1 | 7/2015 | Tamir | |
| 2015/0317602 | A1 | 11/2015 | Rao et al. | |
| 2016/0147738 | A1 | 5/2016 | Geurts et al. | |
| 2016/0162478 | A1 | 6/2016 | Blassin et al. | |
| 2016/0232156 | A1* | 8/2016 | Orsini | G06Q 10/107 |
| 2017/0024461 | A1 | 1/2017 | Mac an tSaoir et al. | |
| 2017/0076244 | A1 | 3/2017 | Bastide et al. | |
| 2018/0039622 | A1 | 2/2018 | Bihani et al. | |
| 2018/0130019 | A1 | 5/2018 | Kolb et al. | |
| 2018/0268081 | A1 | 9/2018 | Kearney | |
| 2019/0236102 | A1 | 8/2019 | Wade et al. | |
| 2019/0384820 | A1 | 12/2019 | Liu et al. | |
| 2020/0311683 | A1 | 10/2020 | Chua et al. | |
| 2020/0320167 | A1* | 10/2020 | Mane | G06F 16/3344 |
| 2020/0394223 | A1 | 12/2020 | Nishimura et al. | |
| 2021/0026859 | A1 | 1/2021 | Vangala et al. | |
| 2021/0089375 | A1 | 3/2021 | Ghafourifar et al. | |
| 2021/0133612 | A1 | 5/2021 | Sinha et al. | |
| 2021/0326537 | A1* | 10/2021 | Liu | G06F 40/47 |
| 2021/0397897 | A1 | 12/2021 | Shae et al. | |
| 2022/0027508 | A1* | 1/2022 | Rao | G06N 7/01 |
| 2022/0067305 | A1* | 3/2022 | Shimizu | G06F 21/31 |
| 2022/0207587 | A1 | 6/2022 | Yang et al. | |
| 2022/0335154 | A1* | 10/2022 | Schuler | G06N 7/01 |
| 2022/0343087 | A1 | 10/2022 | Etches et al. | |
| 2023/0195933 | A1* | 6/2023 | Satish Padmanabhan | G06F 40/263 726/26 |

OTHER PUBLICATIONS

[No Author Listed], "World Trade Statistical Review 2017," World Trade Organization, 2017, 181 pages.

Coinmarketcap.com [online], "Monthly Volume Rankings (Currency)," available on or before Mar. 21, 2021, via Internet Archive: Wayback Machine URL<https://web.archive.org/web/20210323005047/https://coinmarketcap.com/currencies/volume/monthly/>, retrieved on Mar. 15, 2024, URL<https://coinmarketcap.com/currencies/volume/monthly/>, 8 pages.

En.m.wikipedia.org [online], "File:Hash tree.png," Dec. 20, 2010, retrieved on Mar. 15, 2024, retrieved from URL<https://en.m.wikipedia.org/wiki/File:Hash_tree.png>, 3 pages.

En.wikipedia.org [online], "Neural machine translation," last edited on Feb. 18, 2024, available on or before Jun. 21, 2016, retrieved on Mar. 15, 2024, retrieved from URL<https://en.wikipedia.org/wiki/Neural machine translation>, 9 pages.

En.wikipedia.org [online], "Vitalik Buterin", last edited on Mar. 3, 2024, available on or before Mar. 6, 2014, retrieved on Mar. 15, 2024, retrieved from URL<https://en.wikipedia.org/wiki/Vitalik_Buterin>, 10 pages.

Etherscan.io/ [online], "The Ethereum Blockchain Explorer," available on or before Mar. 26, 2021, via Internet Archive: Wayback Machine URL<https://web.archive.org/web/20210326001554/https://etherscan.io/>, retrieved on Mar. 15, 2024, URL<https://web.archive.org/web/20210326001554/https://etherscan.io/>, 2 pages.

Ethplorer.io/ [online], "Ethereum Tokens Explorer," available on or before Mar. 9, 2021, via Internet Archive: Wayback Machine URL<https://web.archive.org/web/20210309005642/https://ethplorer.io/>, retrieved on Mar. 15, 2024, URL<https://ethplorer.io/>, 3 pages.

International Preliminary Report on Patentability in International Appln. No. PCT/US2022/071898, mailed on Nov. 2, 2023, 8 pages.

International Preliminary Report on Patentability in International Appln. No. PCT/US2022/071901, mailed on Nov. 2, 2023, 8 pages.

Manyika et al., "The Internet of Things: mapping the value beyond the hype," McKinsey & Company, Jun. 2015, 24 pages.

Nimdzi.com [online], "THE 2021 NIMDZI 100: The Ranking of the Top 100 Largest Language Service Providers," 2021, retrieved on Mar. 15, 2024, retrieved from URL<https://www.nimdzi.com/nimdzi-100-2021/>, 37 pages.

Reuters.com [online], "Ethereum is top public blockchain, bitcoin No. 13 in China's new index," available on or before Mar. 9, 2019, via Internet Archive: Wayback Machine URL<https://web.archive.org/web/20190209011122/http://www.reuters.com/article/us-crypto-currency-index/ethereum-is-top-public-blockchain-bitcoin-no-13-in-chinas-new-index-idUSKCN1II2R9?feedType=RSS&feedName=businessNews&utm_source=feedburner&utm_medium=feed&utm_campaign=Feed%3A+reuters%2FbusinessNews+%28Business+News%29>, retrieved on Mar. 15, 2014, URL<https://www.reuters.com/article/us-crypto-currency-index/ethereum-is-top-public-blockchain-bitcoinno-13-in-chinas-new-index-idUSKCN1II2R9>, 4 pages.

Schwartz et al., "Machine Translation and Monolingual Postediting: The AFRL WMT-14 System," Proceedings of the Ninth Workshop on Statistical Machine Translation, Jun. 26-27, 2014, pp. 186-194.

Slator.com [online], "Tag: neural machine translation," available on or before Mar. 6, 2021, via Internet Archive: Wayback Machine URL<https://web.archive.org/web/20210306144146/https://slator.com/tag/neural-machine-translation/>, retrieved on Mar. 15, 2024, URL<https://slator.com/tag/neural-machinetranslation/>, 9 pages.

International Search Report and Written Opinion in International Appln. No. PCT/US2022/71898, dated Jun. 30, 2022, 10 pages.

International Search Report and Written Opinion in International Appln. No. PCT/US2022/71901, mailed on Oct. 25, 2022, 10 pages.

Paolucci et al., "Semantic matching of web services capabilities," In The Semantic Web-ISWC 2002: First International Semantic Web Conference Sardinia, Italy, Jun. 9-12, 2002, pp. 333-347.

Shvaiko et al. "A survey of schema-based matching approaches," In Journal on Data Semantics IV, Lecture Notes in Computer Science, 2005, pp. 146-171.

Taghavi et al., "A blockchain-based model for cloud service quality monitoring," IEEE Transactions on Services Computing, Mar./Apr. 2020, 13(2):276-288.

\* cited by examiner

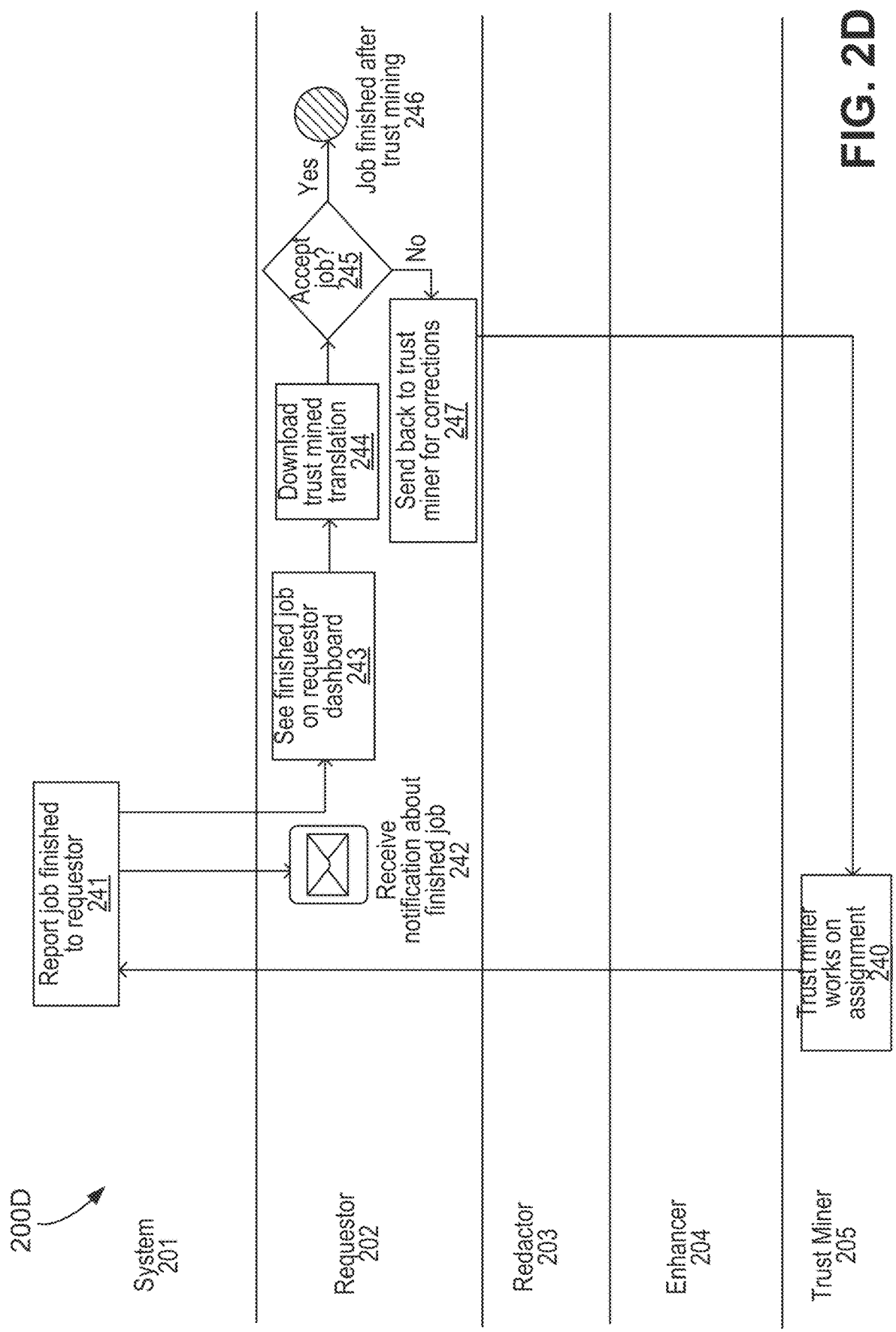

AUTOMATION-ENHANCED TRANSLATION WORKFLOW

CLAIM OF PRIORITY

This application claims the benefits under 35 U.S.C. § 119(e) of U.S. Provisional Patent Application No. 63/178,766, entitled "Taxonomy Matching of Data Subject with Human Resource Skillset Nodes," filed Apr. 23, 2021, U.S. Provisional Patent Application No. 63/178,702, entitled "Computer Implemented Ledger for Quality Scores for Service Providers," filed Apr. 23, 2021, U.S. Provisional Patent Application No. 63/178,771, entitled "User Interface for Translation Editor," filed Apr. 23, 2021, U.S. Provisional Patent Application No. 63/178,704, entitled "Automated Translation Platform," filed Apr. 23, 2021, and U.S. Provisional Patent Application No. 63/178,707, entitled "Automated Anonymization of Personal Information," filed Apr. 23, 2021. The disclosures of the foregoing applications are incorporated herein by reference in their entireties for all purposes.

TECHNICAL FIELD

This specification relates to technology for (i) improving the quality of and (ii) automating, at least in part, the anonymization and translation of content (e.g., textual content in a source file).

BACKGROUND

The need to translate content in order to communicate information has existed since the origins of language. In some cases, the content to be translated is anonymized to avoid sharing private information (e.g., names, social security numbers, financial information, etc.) included in the original source content with unauthorized parties. While anonymization and translation tasks were historically performed exclusively by humans, an increasing number of technologies have become available to automate these tasks. Current technologies for processing content in digital files include technologies for converting the content to machine-readable text (e.g. optical character recognition technologies), technologies for data anonymization (e.g, automated anonymization tools), and technologies for translating text (e.g., natural language processing tools).

SUMMARY

The technology described herein relates to a human-in-the-loop workflow that leverages automation tools for anonymization and translation tasks while still incorporating inputs (e.g., feedback) from human actors having relevant expertise. For example, the human actors (sometimes referred to herein as "service providers" or "executors") can be experienced redactors and/or translation enhancers (or simply "enhancers"), and may have further expertise with particular languages, technical fields, privacy norms, etc. In some cases, a system implementing the human-in-the-loop workflow can continuously improve by dynamically updating one or more processes (e.g., an automated anonymization process, an automated translation process, etc.) based on inputs from the service providers. In some cases, the system can also learn to identify the best service providers to recruit for assisting with a particular anonymization and/or translation task (e.g., based on the service provider's skillset).

Various implementations of the technology described herein may provide one or more of the following advantages.

In some cases, the technology described herein can enable more reliable and higher quality anonymized and/or translated outputs than systems and workflows that do not include a human-in-the-loop. For example, a service provider (e.g., a human redactor or human enhancer) with relevant expertise can identify and fix errors (or other suboptimal outputs) in the anonymized and/or translated content generated via an automated anonymization process and/or an automated translation process.

A human redactor may be able to identify areas where an automated anonymization process was over-inclusive or under-inclusive with respect to content that was redacted. The standards for redaction may be different for different use cases (e.g., financial statements versus medical histories), and the human redactor may provide feedback about the redacted content based on the human redactor's knowledge of these standards. In some cases, the human redactor can also identify when the automated anonymization process miscategorizes confidential information. For example, the automated anonymization process can miscategorize an individual's bank account number as a phone number and label the redacted information accordingly. A human redactor may be able to identify the miscategorization and correct the label associated with the redacted information.

A human translation enhancer may be able to identify areas where an automated translation process has incorrectly or sub-optimally translated a portion of the source content. For example, the human enhancer can identify this information based on his/her expertise in two or more languages, e.g., thereby providing an accurate, precise, and grammatically correct translation. In some cases, the human enhancer can also identify incorrectly or sub-optimally translated portions based on his/her knowledge of a subject matter area associated with the source content (e.g., law, medicine, finance, philosophy, etc.)

In some cases, the technology described herein can enable a service provider to process content much faster than without the assistance of automation tools within an anonymization and/or translation workflow. For example, using the technology described herein, a human redactor or a human enhancer may be able to process many more words per hour than he/she could if he/she were to perform the same anonymization and/or translation task entirely manually.

In some cases, the technology described herein can enable the continuous improvement of an automated anonymization process and/or an automated translation process. For example, feedback about outputs generated by the automated anonymization process and/or an automated translation process can be provided by a service provider (e.g., by correcting or adjusting the outputs). The feedback can be used to dynamically update the automated anonymization process and/or automated translation process so that the processes are more likely to generate the corrected or adjusted output automatically. As more and more anonymization and/or translation tasks are completed using the workflow provided, a system implementing the workflow can become increasingly adept at producing anonymized and/or translated outputs that require a decreasing number of manual corrections or adjustments.

In some cases, the technology described herein can enable a service provider to demonstrate his/her skill at a particular task. For example, a quality assurance service provider can review and rate the quality of anonymization and/or translation performed by a human redactor or a human enhancer. The ratings received by a particular service provider can be used to calculate a metric indicative of their skill at a particular task. For example, the metric can be a trust score indicative of the service provider's skill at translation or redaction. In some cases, the metrics can be more specific, indicating, for example, a service provider's skill at translating from a particular source language to a particular target language, the service provider's skill at translating documents about a certain subject matter, and/or the service provider's skill at redacting certain types of documents. The metric indicative of the particular service provider's skillset can be stored on a blockchain so that the service provider can provably demonstrate the quality of their work. In some cases, anonymization and/or translation tasks can be assigned to particular service providers based on this metric, so that tasks are handled by service providers having appropriate skillsets. This can have the advantage of further improving the quality of anonymization and/or translation by directing tasks to the service providers most qualified to perform those tasks.

In some cases, the technology described herein can store portions of anonymized and/or translated text (sometimes referred to herein as "linguistic assets" or "assets") and rely on these stored assets to perform subsequent anonymization and/or translation tasks. In some applications, similar text can be repeatedly included for anonymization and/or translation across multiple tasks. For example, a business entity that generates multiple documents or files of a certain type (e.g., non-disclosure agreements, consent forms, medical history reports, etc.) may include similar phrases or sentences across multiple documents. In another example, a business entity may repeatedly refer to a particular concept using particular terminology. By storing portions of pre-anonymized and pre-translated text that are associated with the business entity, future instances of similar text can be translated by relying on and recycling the stored assets. This can have the advantage of yielding faster and more accurate anonymization and/or translation compared to translating the similar text de novo every time it appears in an anonymization and/or translation task.

In a general aspect, a method performed by a computing system is provided. The method includes receiving a request to translate source content from a first language to a second language. The method also includes processing the source content by one or more processors to generate first anonymized content by automatically anonymizing confidential information in the source content. The method further includes providing the first anonymized content to a first service provider to provide anonymization input. The method further includes processing the first anonymized content with the anonymization input to generate second anonymized content. The method further includes obtaining a machine translation of the second anonymized content from the first language to the second language. The method further includes providing the machine translation to a second service provider to provide translation input and processing the machine translation with the translation input to generate translated content.

Implementations of the method can include one or more of the following features. The method can include converting by one or more processors at least a portion of the source content to machine-readable text. The method can include providing the second anonymized content to a third service provider to evaluate an anonymization quality of the second anonymized content. The method can include providing the translated content to a third service provider to evaluate a translation quality of the translated content. The method can further include storing data indicative of the translation quality of the translated content in relation to data representing an identity of the second service provider. Storing the data indicative of the translation quality of the translated content can include storing the data indicative of the translation quality on a blockchain. The method can include dynamically updating a process for automatically anonymizing subsequent confidential information based on the anonymization input provided by the first service provider. The method can include dynamically updating a process for obtaining subsequent machine translations based on the translation input provided by the second service provider. Processing the source content to generate the first anonymized content can include replacing the confidential information in the source content with metadata indicative of a category of the replaced confidential information. The method can include storing one or more translated portions of the translated content in a data storage element. Obtaining the machine translation of the second anonymized content can include (i) accessing a data storage element and (ii) recycling one or more portions of previously translated text stored in the data storage element. Obtaining the machine translation of the second anonymized content can include (i) sending a portion of the second anonymized content to multiple translation engines and (ii) evaluating outputs from the multiple translation engines to determine which of the outputs to use in the machine translation. Evaluating the outputs from the multiple translation engines can include calculating a similarity metric between pairs of the outputs.

In another general aspect, a computing system is provided. The computing system includes one or more processors coupled to a memory. The processors and the memory are configured to receive a request to translate source content from a first language to a second language. The processors and the memory are also configured to process the source content by one or more processors to generate first anonymized content by automatically anonymizing confidential information in the source content. The processors and the memory are further configured to provide the first anonymized content to a first service provider to provide anonymization input. The processors and the memory are further configured to process the first anonymized content with the anonymization input to generate second anonymized content. The processors and the memory are further configured to obtain a machine translation of the second anonymized content from the first language to the second language. The processors and the memory are further configured to provide the machine translation to a second service provider to provide translation input and process the machine translation with the translation input to generate translated content.

Implementations of the system can include one or more of the following features. The processors and the memory can be configured to convert at least a portion of the source content to machine-readable text. The processors and the memory can be configured to provide the translated content to a third service provider to evaluate a translation quality of the translated content. The processors and the memory can be configured to store data indicative of the translation quality of the translated content in relation to data representing an identity of the second service provider. The processors and the memory can be configured to dynamically update a process for automatically anonymizing subsequent confidential information based on the anonymization input provided by the first service provider. The processors and the memory can be further configured to dynamically update a process for obtaining subsequent machine translations based on the translation input provided by the second service provider. Processing the source content to generate the first anonymized content can include replacing the confidential information in the source content with metadata indicative of a category of the replaced confidential information. The processors and the memory can be configured to store one or more translated portions of the translated content in a data storage element. Obtaining the machine translation of the second anonymized content can include (i) accessing a data storage element and (ii) recycling one or more portions of previously translated text stored in the data storage element. Obtaining the machine translation of the second anonymized content can include (i) sending a portion of the second anonymized content to multiple translation engines and (ii) evaluating outputs from the multiple translation engines to determine which of the outputs to use in the machine translation. Evaluating the outputs from the multiple translation engines can include calculating a similarity metric between pairs of the outputs.

In another general aspect, a non-transitory computer readable medium is provided. The non-transitory computer readable medium stores instructions that are executable by a processing device, and upon such execution cause the processing device to perform operations. The operations include receiving a request to translate source content from a first language to a second language. The operations also include processing the source content by one or more processors to generate first anonymized content by automatically anonymizing confidential information in the source content. The operations further include providing the first anonymized content to a first service provider to provide anonymization input. The operations further include processing the first anonymized content with the anonymization input to generate second anonymized content. The operations further include obtaining a machine translation of the second anonymized content from the first language to the second language. The operations further include providing the machine translation to a second service provider to provide translation input and processing the machine translation with the translation input to generate translated content.

Implementations of the non-transitory computer readable medium can include one or more of the following features. The operations can include converting by one or more processors at least a portion of the source content to machine-readable text. The operations can include providing the second anonymized content to a third service provider to evaluate an anonymization quality of the second anonymized content. The operations can include providing the translated content to a third service provider to evaluate a translation quality of the translated content. The operations can further include storing data indicative of the translation quality of the translated content in relation to data representing an identity of the second service provider. Storing the data indicative of the translation quality of the translated content can include storing the data indicative of the translation quality on a blockchain. The operations can include dynamically updating a process for automatically anonymizing subsequent confidential information based on the anonymization input provided by the first service provider. The operations can include dynamically updating a process for obtaining subsequent machine translations based on the translation input provided by the second service provider. Processing the source content to generate the first anonymized content can include replacing the confidential information in the source content with metadata indicative of a category of the replaced confidential information. The operations can include storing one or more translated portions of the translated content in a data storage element. Obtaining the machine translation of the second anonymized content can include (i) accessing a data storage element and (ii) recycling one or more portions of previously translated text stored in the data storage element. Obtaining the machine translation of the second anonymized content can include (i) sending a portion of the second anonymized content to multiple translation engines and (ii) evaluating outputs from the multiple translation engines to determine which of the outputs to use in the machine translation. Evaluating the outputs from the multiple translation engines can include calculating a similarity metric between pairs of the outputs.

Other features and advantages of the description will become apparent from the following description, and from the claims. Unless otherwise defined, the technical and scientific terms used herein have the same meaning as commonly understood by one of ordinary skill in the art to which this invention belongs.

BRIEF DESCRIPTION OF THE DRAWINGS

FIGS. 2A-2D are flowcharts of an automation-enhanced workflow.

DETAILED DESCRIPTION

Figure 1:
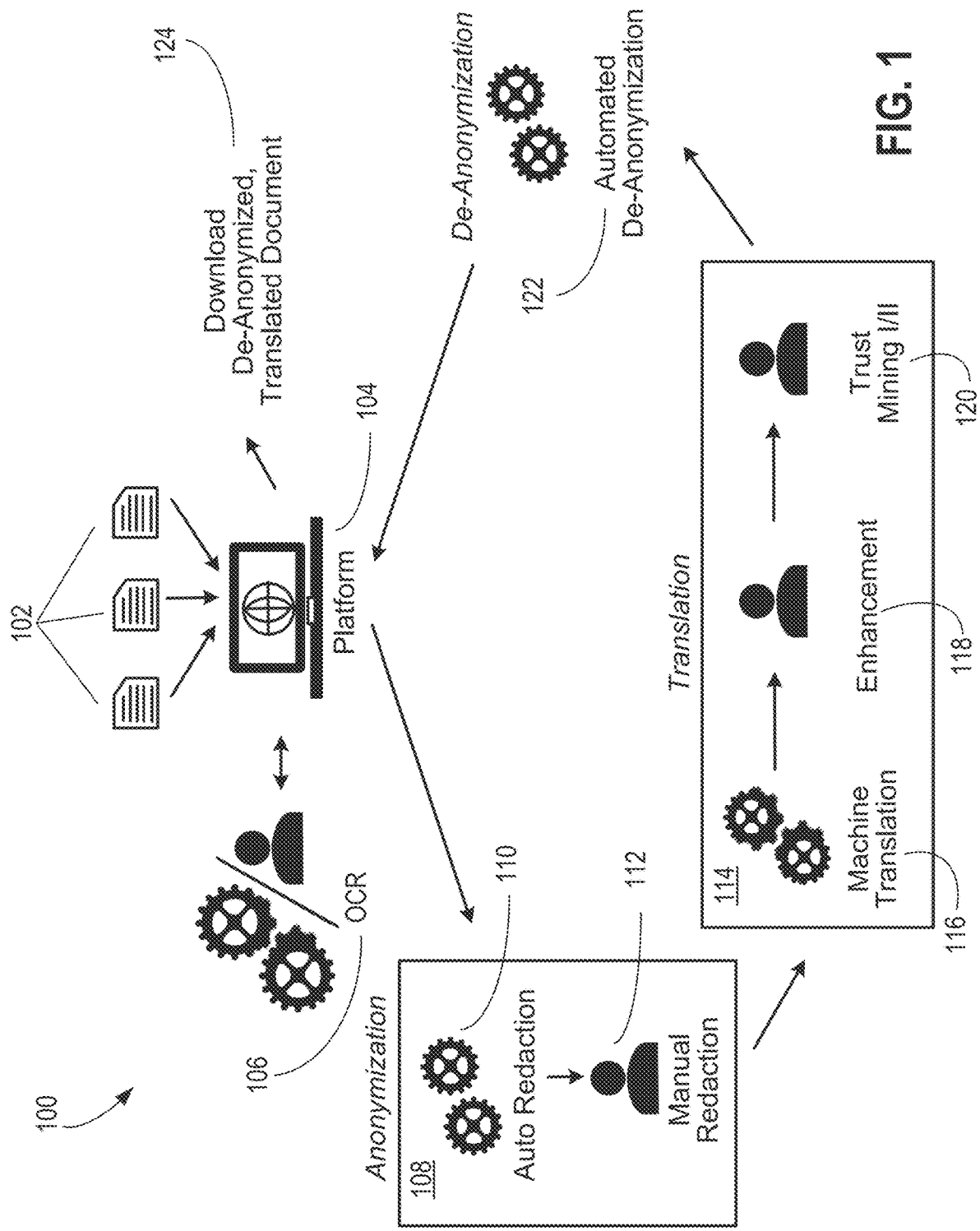
FIG. 1 is a diagram of an automation-enhanced workflow.

FIG. 1 illustrates an example automation-enhanced workflow 100 for processing source content, such as source files 102. The source files can be digital files (e.g., documents) including content (e.g., source content) that a requestor (not shown) may request to be translated from a first language to a second language. In some cases, the source files 102 can include confidential information that the requestor may not want to be shared with unauthorized parties (e.g., an enhancer, a quality assurance service provider, etc.). In some cases, the requestor may own or possess the source files 102 themselves. In some cases, the requestor can be engaged by another party to process the source files 102.

The requestor can request a processing task to process the source files 102 using a platform 104. This can involve uploading the source files 102 and associated metadata such as specific instructions for translation and/or defining which type or knowledge base the text document belongs to (e.g., clinical trials, a specific medical condition, etc.). Information about the knowledge base (e.g., a subject matter of the source files 102) can be used to suggest appropriate service providers to work on the document later in the workflow (described in further detail herein. Requesting the processing task can also include selecting the desired processing steps such as anonymization (including automated and/or manual redaction) and/or translation (including machine translation, translation enhancement, and/or trust mining, which are each described in further detail herein).

In cases where the uploaded source files 102 do not contain machine-readable text, textual source content in the source file can be identified and converted into machine-readable text. For example, the source content (or a portion of the source content) can be converted into machine-readable text using optical character recognition (OCR) 106. In some implementations, OCR can be done entirely within the platform 104. In some implementations, a service provider can download the source file 102 to a local machine and use an external tool to perform the OCR, following which, new source files 102 (containing machine-readable text) can be uploaded to the platform 104 for subsequent processing steps.

In some implementations, the source files 102 can then go through an anonymization process 108 (sometimes referred to as "redaction"). The anonymization process 108 can include an automated redaction step 110 and/or a manual redaction step 112. The automated redaction step 110 can be performed, for example, by a machine learning algorithm, which tags and classifies for anonymization sensitive, personal, or confidential information according to its type. Tags and classifications can include, e.g., F_NAME for female names; M_NAME for male names; SURNAME for surnames; EMAIL_ADRESS for emails; NORP for nationalities or religious or political groups; FAC for buildings, airports, highways, etc.; ORG for companies, agencies, institutions, etc.; GPE for geographical information; LOC for non-GPE locations; PRODUCT for names of products, patents, or other commercial product names; EVENT for named hurricanes, battles, wars, etc.; WORK_OF_ART for titles of books, songs, etc.; LAW for named documents made into laws; LANGUAGE for any named language; DATE for absolute or relative dates or periods; TIME for times shorter than a day; PERCENT for percentages; MONEY for monetary values; QUANTITY for measurements; ORDINAL for "first", "second," etc.; CARDINAL for numerals that do not fall under another type; CODE for protocol and product codes; URL for web pages, links, etc.; POS for company positions; PHO for phone or fax numbers; and OTHER for any other information that might be confidential.

Following the automated redaction step 110, a human service provider referred to as a "redactor" can manually review the output of the automated redaction step by adding, removing, and/or correcting the tags included in the output to generate a modified anonymized output. In some cases, as described in further detail below, the human service provider can be selected to perform the manual redaction step 112 based on a demonstrated skillset for redaction and/or for working with documents involving similar subject matter. In some cases, the modifications made by the human redactor can be fed back to dynamically update the automated redaction step 110 to improve its performance on future tasks. Additional details of the anonymization process 108, including the automated redaction step 110 and the manual redaction step 112 are provided in greater detail herein.

In some implementations, the work of the manual redactor in the manual redaction step 112 can be reviewed by a quality assurance service provider (sometimes referred to herein as a "trust miner"). The quality assurance service provider can be a human and can perform some or all of the same roles of the redactor. For example, the quality assurance service provider can access instructions submitted by the requestor and can correct and/or approve portions of the anonymized content outputted from the manual redaction step 112. In some implementations, based on the feedback (e.g., corrections and/or approval) provided by the quality assurance service provider, a metric (e.g., a "trust score") can be calculated indicative of a performance of the redactor who performed the manual redaction step 112. In some implementations, the quality assurance service provider can provide a value for the metric directly. In some implementations, the value of the metric can be aggregated with other values of the metric associated with the same redactor (e.g., from previous tasks) to determine an aggregated value. As described herein, one or more of these values can be stored for each redactor, (e.g., on a blockchain) so that each enhancer can provably demonstrate their skillset and so that future tasks can be directed to the best-qualified service providers. In some cases, trust scores for a redactor can be broadly indicative of their overall task performance. However, in some cases, trust scores for a redactor can be indicative of more specific skills such as anonymization performance for source files of a particular language, anonymization performance for documents about a particular subject matter, redaction speed, etc.

In some implementations, following the anonymization process 108, anonymized content outputted by the anonymization process 108 can go through a translation process 114. The translation process 114 can include an automated machine translation step 116, an enhancement step 118 and/or a trust mining step 120.

At the machine translation step 116, the anonymized output from the anonymization process 108 can be translated by one or more translation engines. The translation engines can include third-party translation engines, and they can also include in-house translation tools (e.g., neural networks or transformers used for natural language processing). The automated machine translation step 116 can also include accessing and using (e.g., recycling) stored linguistic "assets", which can be a word, a phrase, or a sentence that has been translated in a previous processing task and appears in the current task. In some cases, the access to certain stores of linguistic assets can be restricted by the use of gated communities. For example, certain stores of linguistic assets may only be accessible to requestors associated with a particular business entity, and in some cases, the stored linguistic assets may only include assets that were translated in previous processing tasks from requestors associated with the same business entity. Additional details about the machine translation step 116 are described herein.

At the enhancement step 118, a machine translation generated during the machine translation step 116 can be enhanced by a human service provider (referred to as "translation enhancer" or simply an "enhancer"). The enhancer can manually review the machine translation, by correcting and/or approving portions of the machine translation to generate modified translated content. In some case, the enhancer may use specific instructions submitted by the requestor in his/her review of the machine translation. In some cases, as described in further detail below, the translation enhancer can be selected to perform the enhancement step 118 based on a demonstrated skillset for translating between particular languages and/or for working with documents involving similar subject matter. In some cases, the modifications made by the enhancer can be fed back to dynamically update the automated machine translation step 116 to improve its performance on future tasks.

Following the enhancement step 118, the translated content output from the enhancement step 118 can go through a trust mining step 120. In the trust mining step 120, a human quality assurance service provider (or "trust miner") can review the translated content output from the enhancement step 118. In some implementations, the trust miner can perform some or all of the same roles of the enhancer. For example, the trust miner can access instructions submitted by the requestor and can correct and/or approve portions of the translated content output from the enhancement step 118. In some implementations, based on the feedback (e.g., corrections and/or approval) provided by the trust miner, a metric (e.g., a "trust score") can be calculated indicative of a performance of the enhancer who performed the enhancement step 118. In some implementations, the trust miner can provide a value for the metric directly. In some implementations, the value of the metric can be aggregated with other values of the metric associated with the same enhancer (e.g., from previous tasks) to determine an aggregated value. As described herein, one or more of these values can be stored for each enhancer, (e.g., on a blockchain) so that each enhancer can provably demonstrate their skillset and so that future tasks can be directed to the best-qualified service providers. In some cases, trust scores for an enhancer can be broadly indicative of their overall task performance. However, in some cases, trust scores for an enhancer can be indicative of more specific skills such as translation performance from a first particular language to a second particular language, translation performance for documents about a particular subject matter, translation speed, etc. In some cases, the trust mining step 120 can include review by multiple trust miners, for example, based on instructions submitted by the requestor for the processing task. The final translated content can also be stored as one or more newly generated linguistic assets in an asset store. Additional details of the translation process 114, including the automated machine translation step 116, the enhancement step 118, and the trust mining step 120 are provided in greater detail herein.

Following the translation process 114, translated content outputted by the translation process 114 can undergo an automated de-anonymization process 122. During the de-anonymization process 122, the translated (and previously anonymized) content can have redacted portions replaced with their original corresponding text. In this way, the original text, which may be private, sensitive, or confidential, may avoid being seen by unauthorized parties such as a human enhancer or a human trust miner. Furthermore, since the translation process 114 takes place after the anonymization step 108, the linguistic assets generated during the translation process 114 may be more broadly applicable than if confidential information was not removed prior to translation. For example, because of the previously described use of categorical tags when redacting information, a linguistic asset including a M_NAME tag may be generally applicable and reusable for similar text including any male name rather than only text referring to men named "John."

Following the de-anonymization process 122, the de-anonymized and translated content outputted from the de-anonymization process can be uploaded to platform 104. The content can be uploaded as one or more files (e.g., documents), which can be made available to the requestor. At step 124, the requestor can download the de-anonymized, translated files via the platform 104.

FIGS. 2A-2D illustrate an example automation-enhanced workflow 200 (split into sub-workflows 200A, 200B, 200C, 200D). The workflow 200 is similar to the general automation-enhanced workflow 100 described in relation to FIG. 1, but includes additional details and alternative process flows. The workflow includes steps to be completed by a system 201, a requestor 202, a redactor 203, an enhancer 204, and a trust miner 205. The system 201 can correspond to the platform 104 described in relation to FIG. 1. As described above, the redactor 203, the enhancer 204, and the trust miner 205 are all service provider roles and refer to human actors.

At step 206, the requestor 202 uploads a file to the system 202. For example, the file can be the source files 102 described in relation to FIG. 1. The requestor 202 can also set job parameters (207). The job parameters can include a list of processes that the requestor 202 desires to be performed such as an OCR process, an automated redaction process (e.g., automated redaction step 110), a manual redaction process (e.g., manual redaction step 112), a machine translation process (e.g., machine translation step 116), a translation enhancement process (e.g., enhancement step 118), and/or a quality assurance process (e.g., trust mining process 120). The requestor 202 can select any combination of the above processes. In some implementations, setting the job parameters (207) can also include providing instructions for the redactor 203, the enhancer 204, or the trust miner 205.

At step 208, the system 201 processes the file upload. At step 209, the system 201 determines whether OCR is appropriate (209). The system 201 can make this decision based on a file type of the source file (e.g., a PDF file), based on analyzing the source file to identify if it includes machine-readable text, or based on a job parameter set by the requestor 202. If OCR is appropriate, the system 201 can send the file to an OCR service (210) to convert source content in the source file to machine-readable text prior to moving on to step 211. If OCR is not to be performed, the system 201 can go directly to step 211.

At step 211, the system 201 can determine whether an automatic anonymization step (e.g., automatic redaction step 210) is appropriate. The system 201 can make this determination based on job parameters set by the requestor 202. If an automatic anonymization step is appropriate, the system 201 can send the file to an anonymization service (212) prior to moving to step 213. The anonymization service can be an external anonymization service or it can be an anonymization service included in the system 201. An example of an anonymization service is further described below in relation to FIGS. 7-8. If an automatic anonymization step is not appropriate, the system can move directly to step 213.

At step 213, the system can prepare a list of possible redactors to perform a manual redaction process. Based on this list, the system 201 can proceed with a service provider selection process (214) to select a redactor. The service provider selection process can select the redactor based on a skillset and/or availability of the redactor. Details of an example service provider selection process 400 are described in further detail herein in relation to FIG. 4. If no redactors are available to accept the task, the process ends at endpoint 215. Alternatively, if a redactor 203 does accept the task, the redactor 203 then works on the assignment (216), performing a manual redaction process.

Figure 2A:
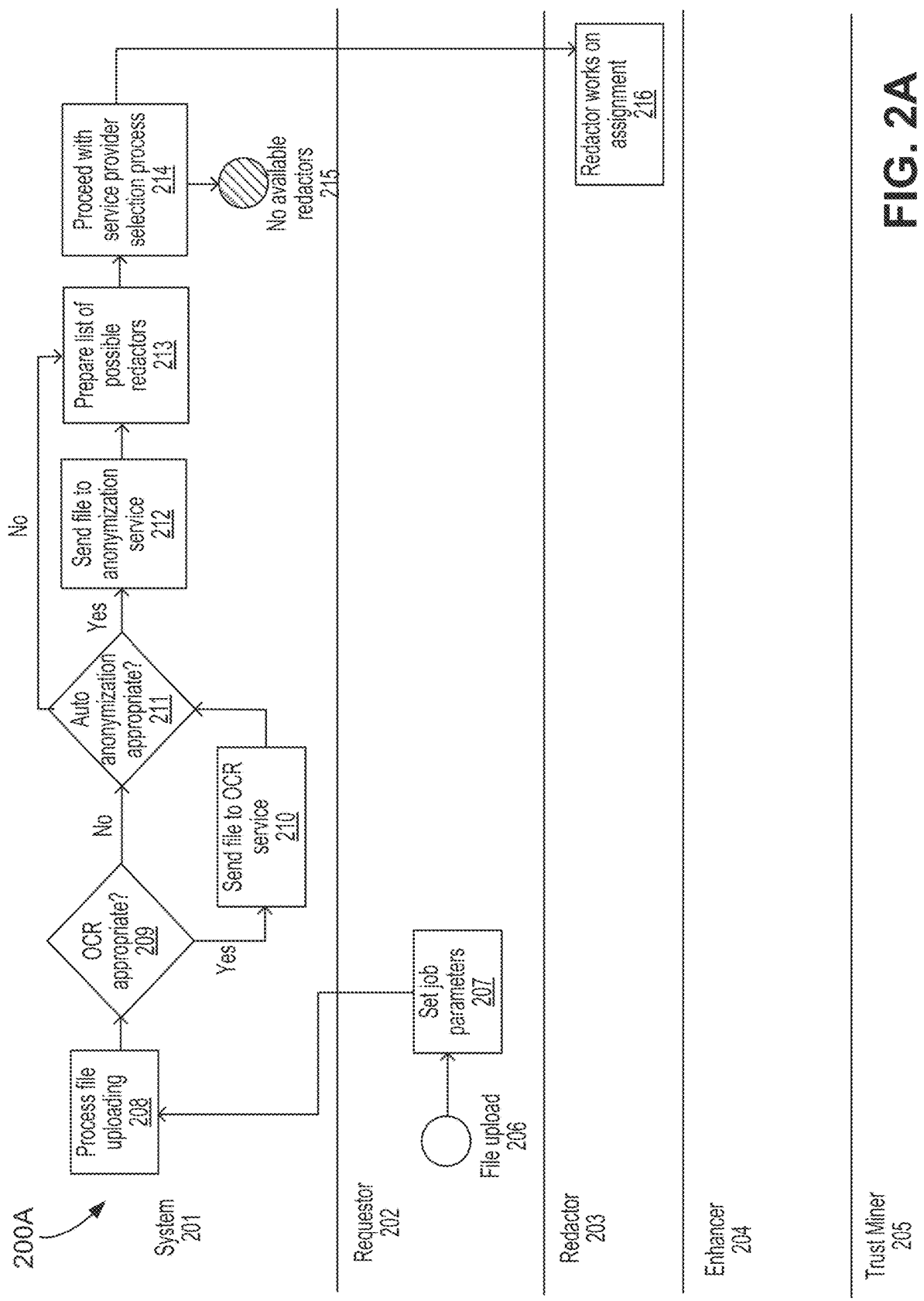
Figure 2B:
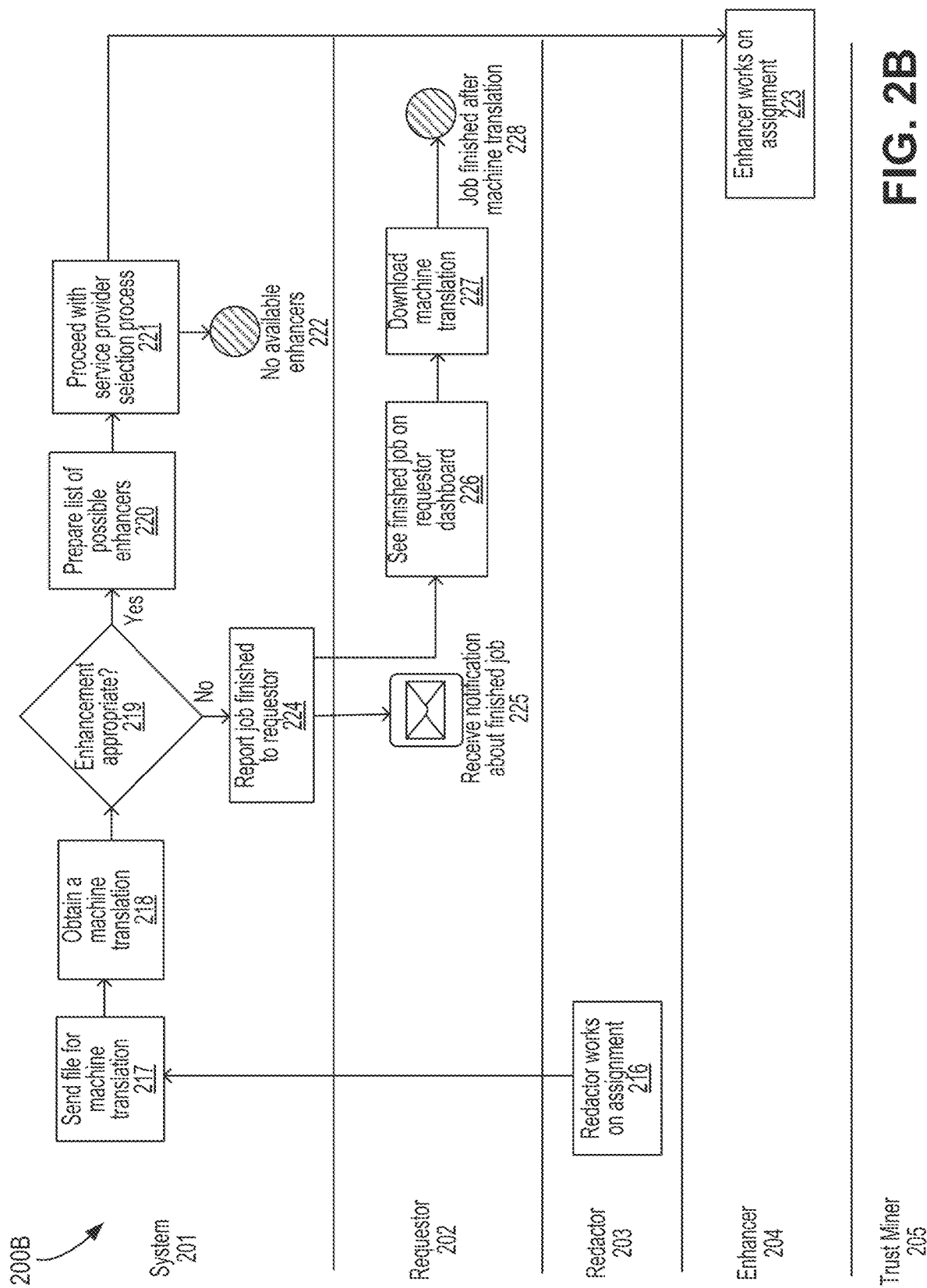

Referring now to FIG. 2B and sub-process 200B, after the redactor 203 finishes working on the assignment at step 216, the system 201 can send the file generated by the redactor 203 for machine translation (217). At step 218, the system 201 obtains the machine translation.

Figure 3:
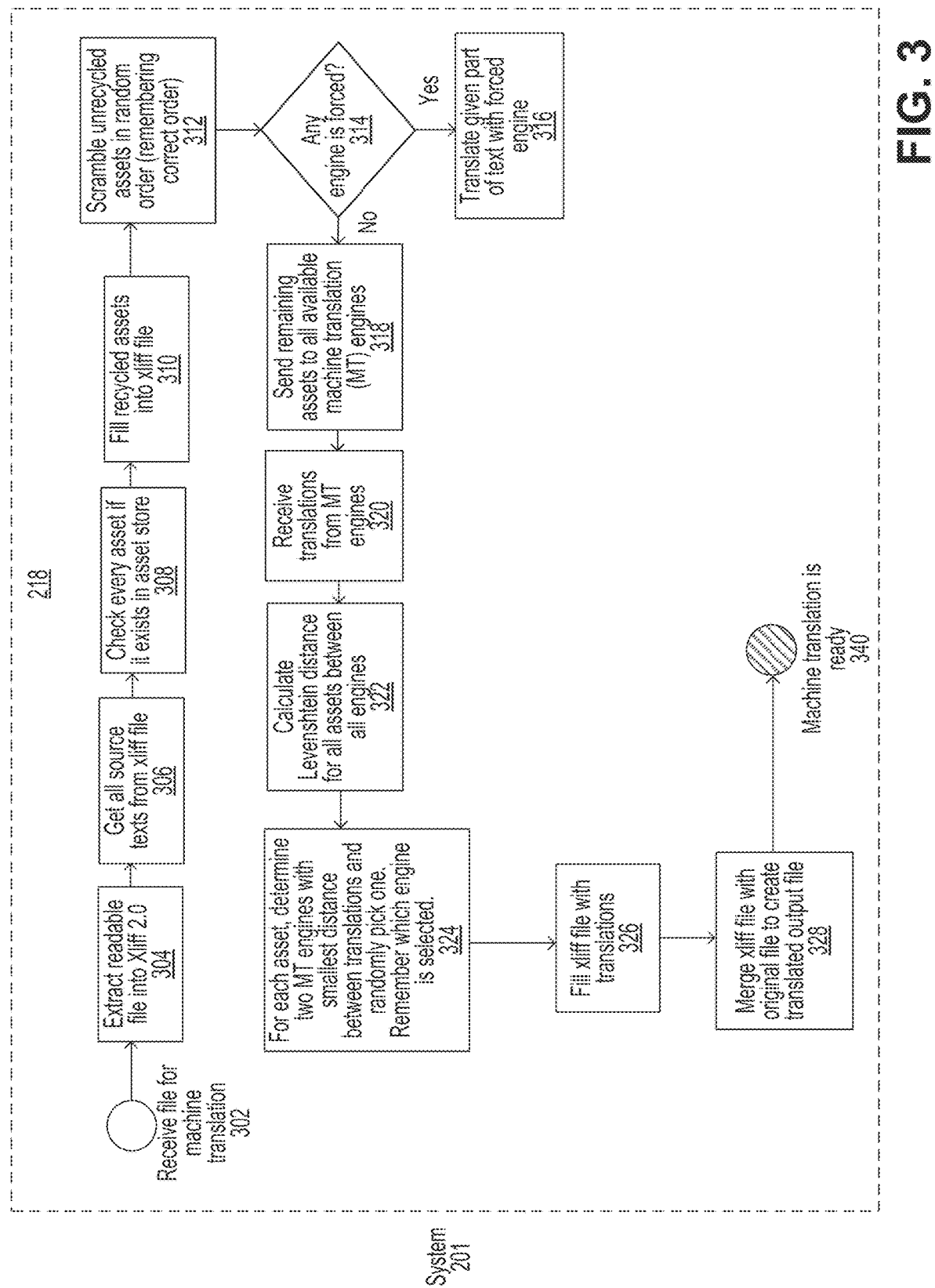
FIG. 3 is a flowchart of a process for obtaining a machine translation.

Referring to FIG. 3, a process for obtaining a machine translation (step 218) is shown in greater detail. At step 302, the system 201 receives a file for machine translation 302. For example, the file can be the output from an anonymization process including an automated redaction step and a manual redaction step. The system 201 then extracts the readable file into Xliff 2.0, a bitext format that standardizes the way localizable data are passed between and among tools. In some implementations other data formats can be used. At step 306, the system 201 gathers all source texts identified from the xliff file and, at step 308, the system 201 checks every asset to see if it already exists in an asset store. The asset store can be a data storage element (e.g., a database) that stores previously translated text (e.g., previously translated linguistic assets) and is accessible by the system 201. At step 310, the system 201 can fill recycled assets into the xliff file, for example, if one or more of the assets in the asset store match the text to be translated.

At step 312, the system 201 scrambles the unrecycled assets in a random order while remembering the correct order. This is done prior to sending the assets out to machine translation (MT) engines in order to protect the security and privacy of the underlying content. At step 314, the system 201 determines if any engine is forced, meaning that the requestor 202 has specifically requested a particular asset to be translated using a particular MT engine. If so, the system translates the given part of the text with the forced engine (316). All remaining assets are sent to one or more of available MT engines (318), and the system receives translations from each of the MT engines (320). The MT engines can include in-house machine translation technologies and/or external MT engines such as Google Translate, Amazon Translate, Azure Translator, or IQVIA translation API.

Upon receiving the translations from the various MT engines, the system 201 can calculate a Levenshtein distance for all assets between all engines (322). In some implementations, other metrics can be used to determine a similarity between the translations received from pairs of MT engines for a particular asset. At step 324, the system 201 determines, for each asset, the two MT engines with smallest distance between their translations and randomly picks one of two translations to use in the machine translation. The system 201 also remembers which engine is selected. This selection process can have the advantage of selecting better, independently-derived and closely matched translations from among the MT engines. In addition, metadata about the assets and the selected engine can be used to improve MT engine selection during subsequent translation tasks. For example, the metadata may reveal that one MT engine consistently excels in translating between a particular source language and a particular target language or that another MT engine consistently excels in documents containing clinical subject matter. These revelations can be used to preference the output of a particular MT engine in certain settings.

At step 326, the system 201 fills the xliff file with the selected translations and, at step 328, the system 201 merges the xliff file with the original file to create a translated output file. This brings the system 201 to endpoint 340, at which the machine translation is ready.

Referring again to FIG. 2B, after a machine translation is obtained at step 218, the system 201 can determine if enhancement is appropriate (219). This determination can be made based on a job parameter set by the requestor 202. If enhancement is not appropriate, the system 201 can report that the job is finished to the requestor (224). The requestor 202 can receive a notification about the finished job (225). Alternatively or in addition, the requestor 202 can see that the job is finished on the requestor's dashboard within the platform (226) and can download the machine translation (227). At this point, the job can be finished after the machine translation step (228).

If, at step 219, it is determined that enhancement is appropriate, then the system 201, at step 220, can prepare a list of possible enhancers to perform an enhancement process. Based on this list, the system 201 can proceed with a service provider selection process (221) to select an enhancer. The service provider selection process can select the enhancer based on a skillset and/or availability of the enhancer. Details of an example service provider selection process 400 are described in further detail herein in relation to FIG. 4. If no enhancers are available to accept the task, the process ends at endpoint 222. Alternatively, if an enhancer 204 does accept the task, the enhancer 204 then works on the assignment (223), performing an enhancement process.

Figure 2C:
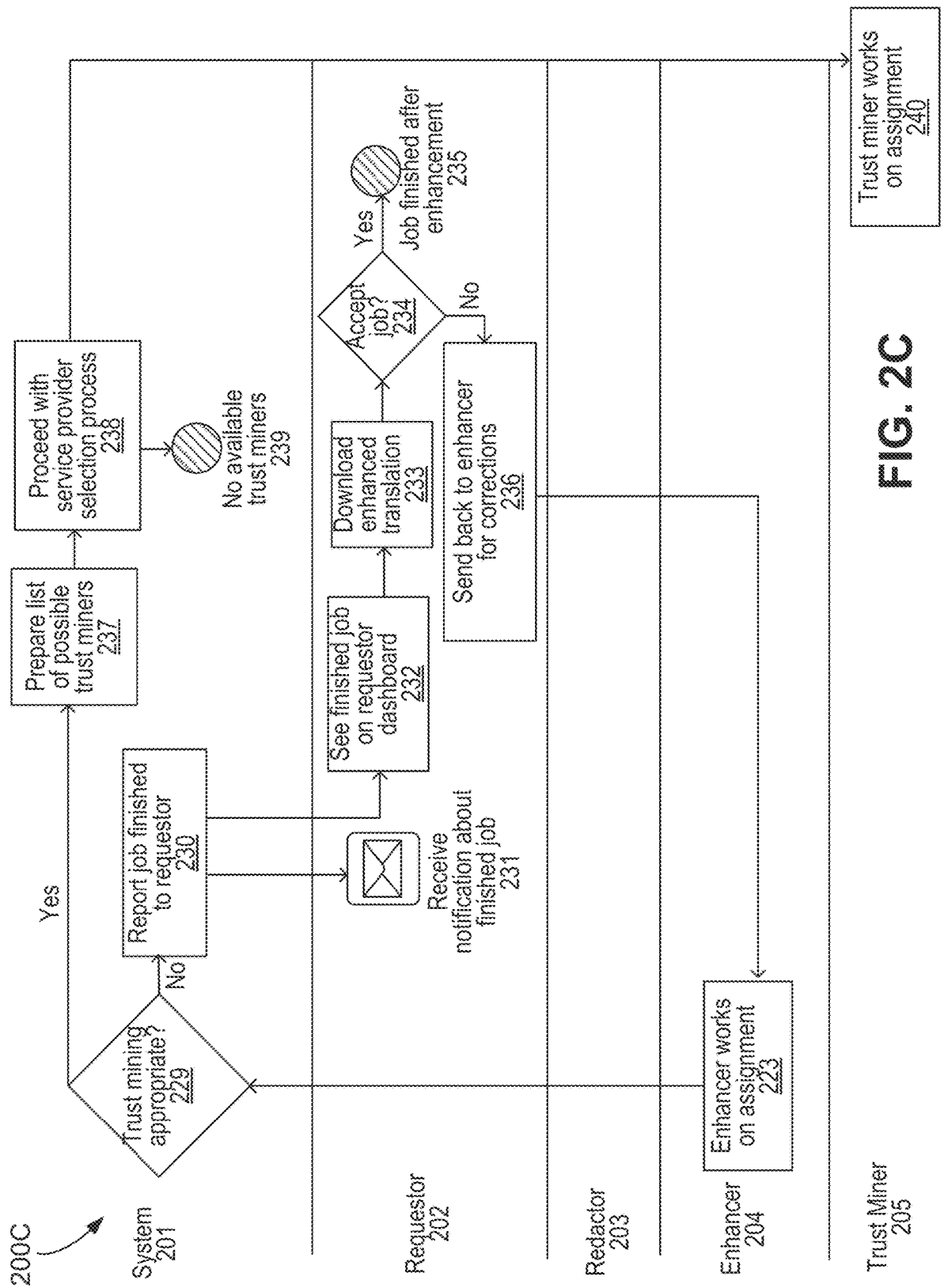

Referring now to FIG. 2C and sub-process 200C, after the enhancer 204 finishes working on the assignment at step 223, the system 201 can determine if trust mining is appropriate (229). This determination can be made based on a job parameter set by the requestor 202. If trust mining is not appropriate, the system 201 can report that the job is finished to the requestor (230). The requestor 202 can receive a notification about the finished job (231). Alternatively or in addition, the requestor 202 can see that the job is finished on the requestor's dashboard within the platform (232) and can download the enhanced translation (233). At step 234, the requestor 202 can decide whether to accept the job. If the requestor 202 accepts the job, then the job is finished after enhancement (235). However, if the requestor 202 does not accept the job, then at step 236, the requestor 202 can send the job back to the enhancer 204 for corrections, returning to step 223.

If, at step 229, the system 201 determines that trust mining is indeed appropriate, then at step 237, the system 201 can prepare a list of possible trust miners to perform a trust mining process. Based on this list, the system 201 can proceed with a service provider selection process (238) to select an enhancer. The service provider selection process can select the enhancer based on a skillset and/or availability of the enhancer. Details of an example service provider selection process 400 are described in further detail herein in relation to FIG. 4. If no trust miners are available to accept the task, the process ends at endpoint 239. Alternatively, if a trust miner 205 does accept the task, the trust miner 205 then works on the assignment (240), performing a trust mining process.

Referring now to FIG. 2D and sub-process 200D, after the trust miner 205 finishes working on the assignment at step 240, the system 201 can report that the job is finished to the requestor (241). The requestor 202 can receive a notification about the finished job (242). Alternatively or in addition, the requestor 202 can see that the job is finished on the requestor's dashboard within the platform (243) and can download the trust mined translation (244). At step 245 the requestor 202 can decide whether to accept the job. If the requestor 202 accepts the job, then the job is finished after trust mining (246). However, if the requestor 202 does not accept the job, then at step 247, the requestor 202 can send the job back to the trust miner 205 for corrections, returning to step 240. The workflow 200 can continue until an endpoint (e.g., one of endpoints 215, 222, 228, 235, 239, 246) is reached.

Figure 4:
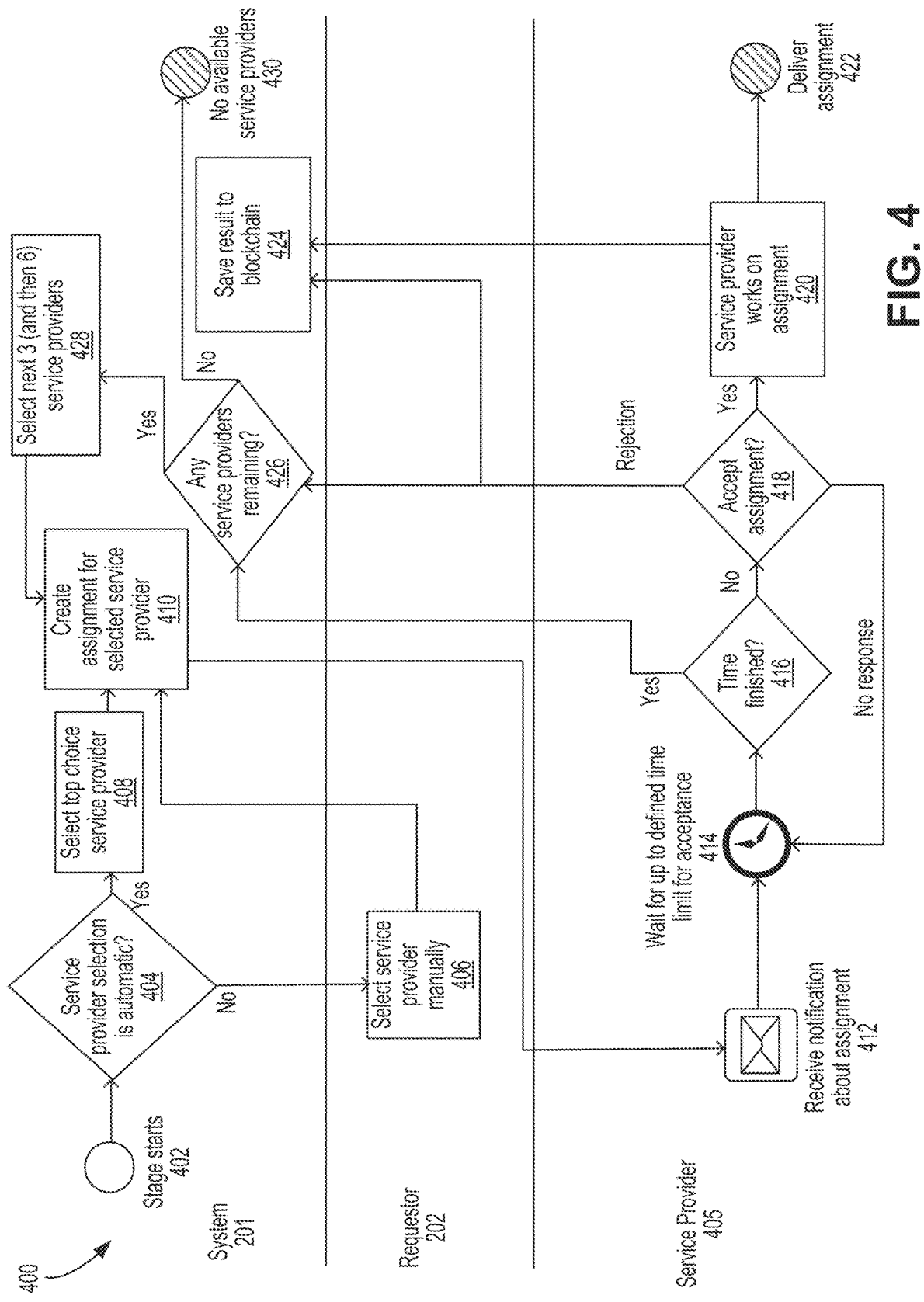
FIG. 4 is a flowchart of a process for selecting a service provider to perform a task.

Referring now to FIG. 4, a process 400 for selecting a service provider to perform a task is shown in greater detail. For example, the process 400 can be implemented at any of steps 214, 221, 238 described above in relation to FIGS.

2A-2C. The process 400 can be used to select a redactor, an enhancer, and/or a trust miner. The stage starts at step 402, and at step 404, the system 201 can determine if the service provider selection is automatic. This determination can be made based on a job parameter set by the requestor 202. If the service provider selection is not automatic, then the requestor 202 can provide input to select his/her preferred service provider manually (406) prior to step 410. Alternatively, if the service provider selection is automatic, then at step 408, the system 201 can automatically select a top-choice service provider prior to step 410. The ranking of service providers can be determined using the metrics (e.g., trust scores) described above in relation to FIG. 1.

At step 410, the system 210 creates the assignment for the selected service provider. At step 412, the selected service provider 405 (e.g., a redactor, an enhancer, or a trust miner) can receive a notification about the assignment. In some implementations, the service provider 405 may have a defined amount of time to accept the assignment (e.g., 24 hours, 48 hours, 72 hours, 1 week, etc.). At step 414, the service provider 405 is allowed to wait for up to the defined time limit before accepting.

At step 416, if the time is not yet finished, the service provider 405 can choose, at step 418, whether or not to accept the assignment. If the service provider 405 does not respond to the request for acceptance, then the wait for the service provider's acceptance continues at step 414. The service provider 405 can also actively reject the assignment, which can cause the process 400 to move directly to step 426 to determine if there are any other service providers remaining who could perform the task. In some implementations, information indicative of the service provider's rejection of the assignment can be saved on a blockchain at step 424. For example, metadata related to the assignment can be stored such as an identifier of the service provider, a source language of the file, a target language of the file, a genre or type of the file, a taxonomy key, a rejection reason, etc. If the service provider 405 does accept the assignment at step 418, then the service provider 405 works on the assignment (420). Results of the service provider's work can be saved, by the system 201, to a blockchain (424). Metadata saved to the blockchain can include, e.g., an assignment identifier, a service provider identifier, a quality assurance metric for the service provider, an entry date, a source language of the file, a target language of the file, a genre or type of the file, a quality assurance score for the assignment, an asset count, a recycled asset count, an indicator of whether a deadline was met, and a taxonomy key. Upon completing the assignment, the service provider can deliver the assignment at endpoint 422, concluding the service provider selection process 400.

Referring back to step 416, if the time for acceptance is allowed to finish without the service provider accepting the assignment, then the system 201 can determine if there are any other potential service providers remaining who could perform the task (426). If there are none, then the process 400 ends at endpoint 430 with no available service providers. However, if there are service providers remaining, the system 201 can, at step 428, select additional service providers. In some implementations, upon reaching step 428 for the first time during the process 400, the system 201 can select the next 3 highest ranked service providers. However, upon reaching step 428 for the second time, the system 201 can select the next 6 highest ranked service providers. The process 400 then moves back to step 410, with the system 201 creating an assignment for all of the selected service providers. The process 400 can continue in this manner until either endpoint 422 or endpoint 430 is realized.

Figure 5A:
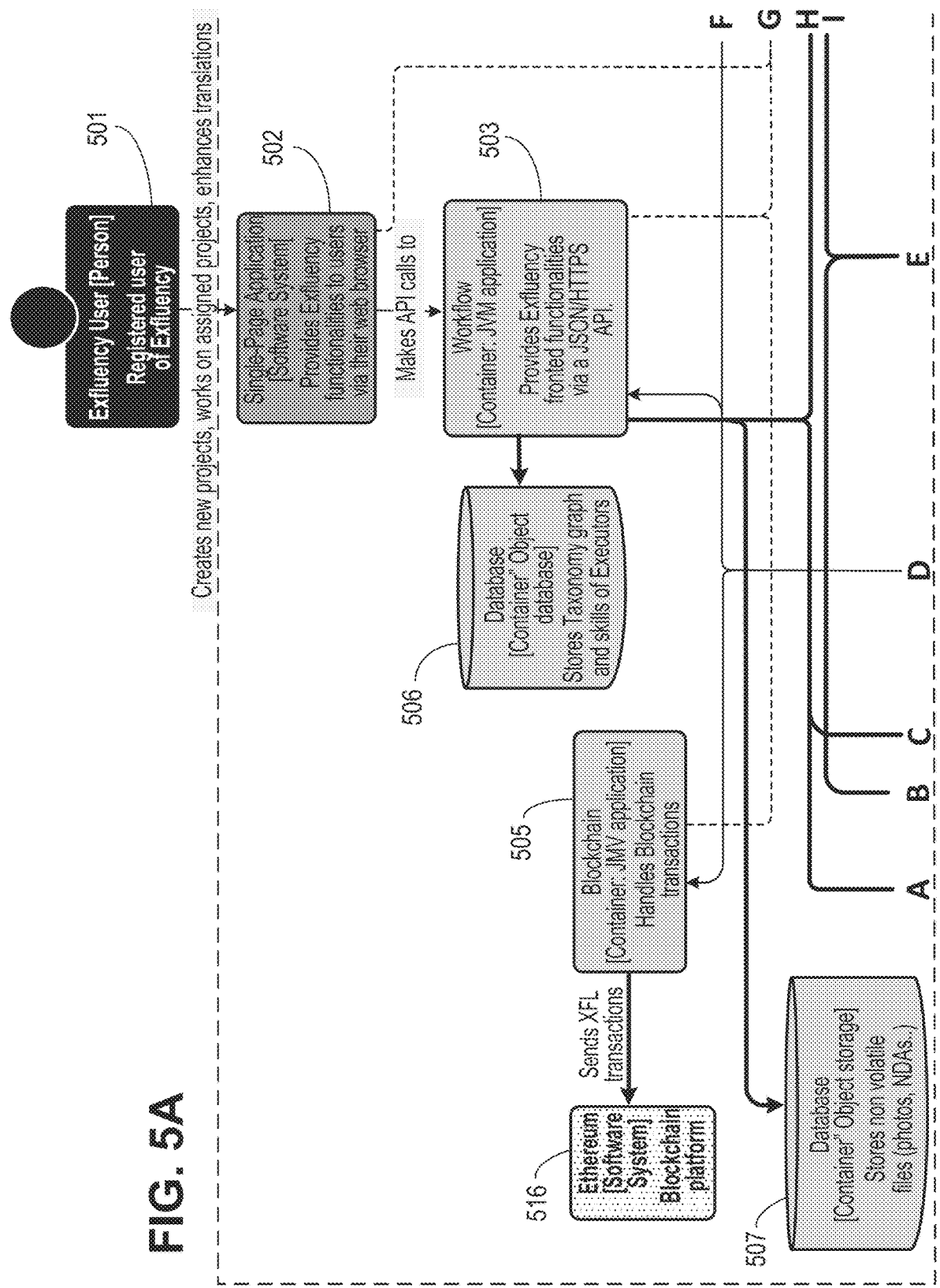
FIGS. 5A-5C are diagrams illustrating portions of a system for implementing an automation-enhanced workflow.
Figure 5B:
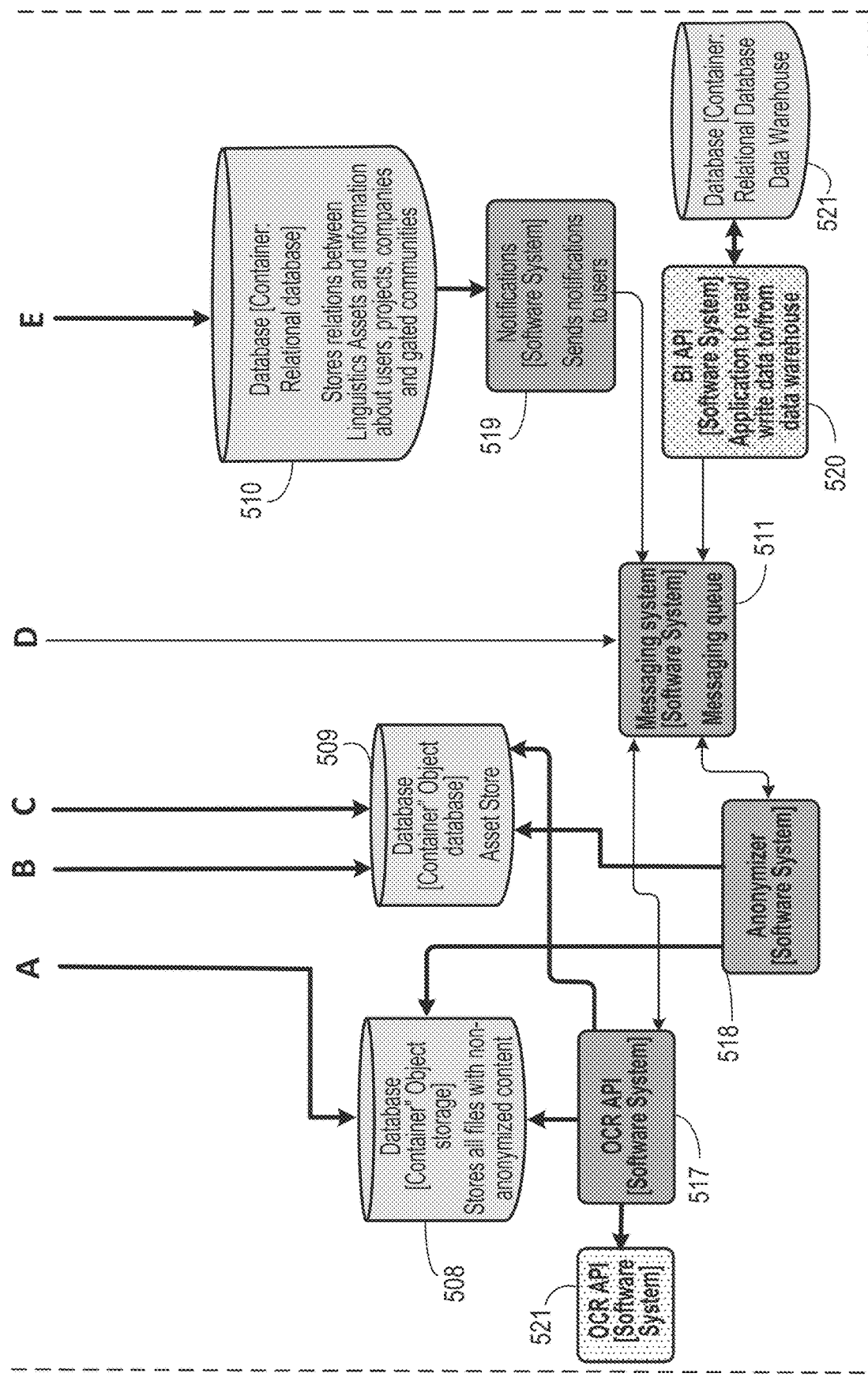
Figure 5C:
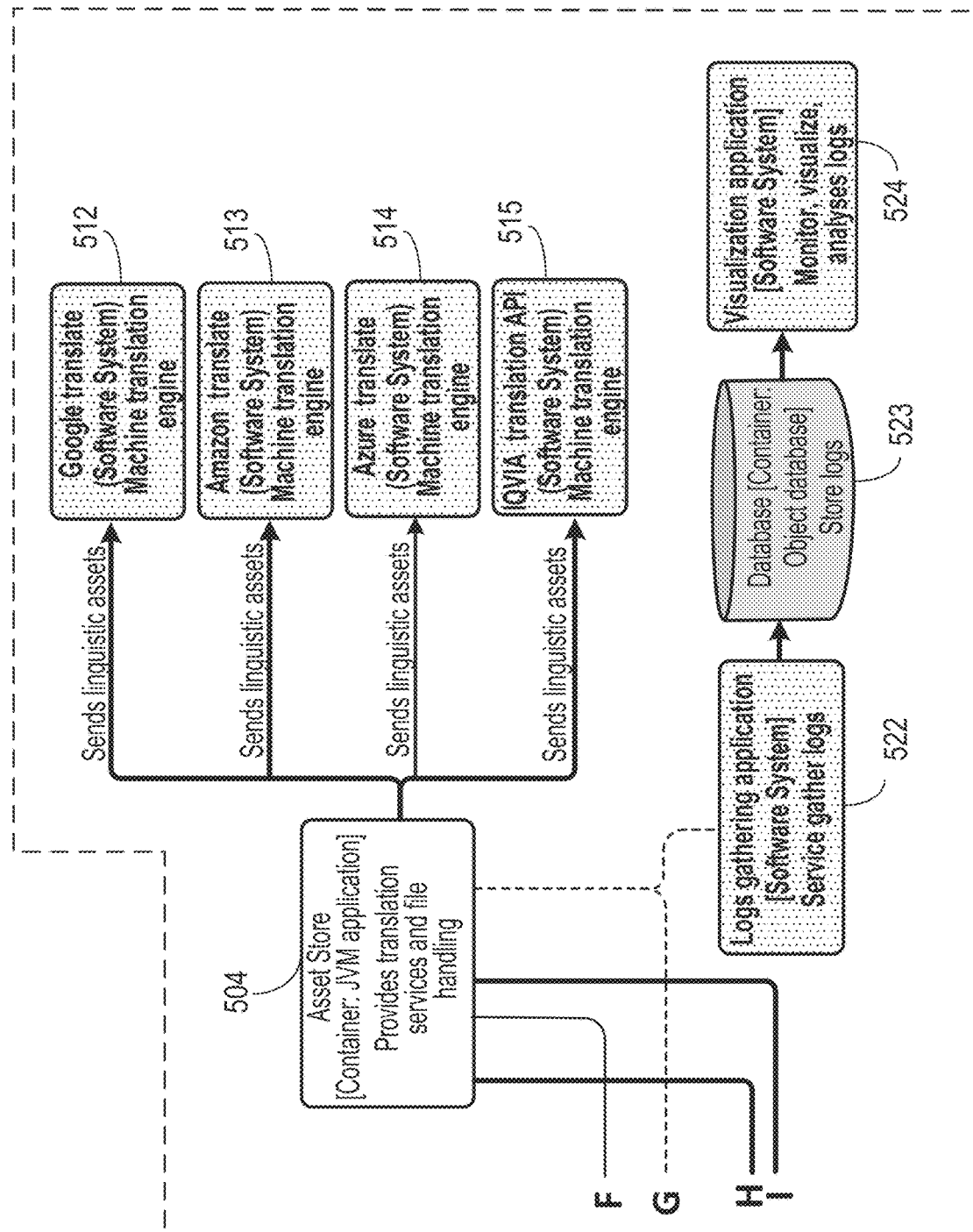

FIGS. 5A-5C shows a system 500 for implementing an automation-enhanced workflow such as workflows 100, 200. FIGS. 5A-5C also shows a user 501 who can interact with the system 500 to create new projects, work on assigned projects, enhance translations, etc. The user 501 can correspond to the requestor 202, redactor 203, enhancer 204, or the trust miner 205 described above in relation to FIGS. 2A-2D.

With respect to the system 500, the architecture of the system is based on multiple services communicating with one another asynchronously. This approach can allow for high scalability and parallel development of various functionalities of the system 500. In FIGS. 5A-5C, gray objects represent components that are written and managed by a single business entity. The gray cylinders, in particular, represent data storages such as databases. Taken together, the gray objects can correspond to the platform 104 described in relation to FIG. 1 or the system 201 described in relation to FIGS. 2A-2D. The dot-filled boxes shown in FIGS. 5A-5C refer to third party APIs which are used by the single business entity managing the gray components. Solid thick black lines represent data flow, solid thin black lines represent communication with a message queue, and dashed black lines represent the gathering of monitoring information.

The user 501 interfaces with the system 500 via a single-page application 502 that provides functionalities of the system 500 to the user 510 via a web browser. The single-page application 502 makes API calls to a workflow application 503. The workflow application 503 is the main application of the system 500, providing data for a user interface of the single-page application 502 and monitoring ongoing and scheduled file-processing jobs. The workflow application 503 can receive data and/or send data to an asset store service 504, a blockchain service 505, and databases 506, 507, 508, 509, 510.

Database 506 can be a graph database that stores a taxonomy graph and skills of executors (e.g., service providers). The database is used for storing a directed graph corresponding to a hierarchical classification of skill categories. Relationships among such categories are retained in the directed graph. The directed graph includes a root node (a starting node) and a plurality of nodes connected by a plurality of edges. Each node is labeled with a title indicating a category or subcategory, e.g., "Internet", "Email", "Internet mail protocols", "Local Mail Transfer Protocol", etc. Each edge is labeled with "SUBCATEGORY". A plurality of semantic paths are formed in the directed graph, starting from the root node and ending at a node having a title indicating a specific subcategory. The skill taxonomy becomes more specific along each path (e.g., Root node→"Science"→"Scientific problems"→"Unsolved problems in biology"→"Aliments of unknown cause-"→"Autoimmune diseases"→"Asthma"). Additional information about taxonomy graphs is provided in co-pending application U.S. patent application Ser. No. 17/728,460, the contents of which are incorporated here by reference in their entirety.

Figure 6:
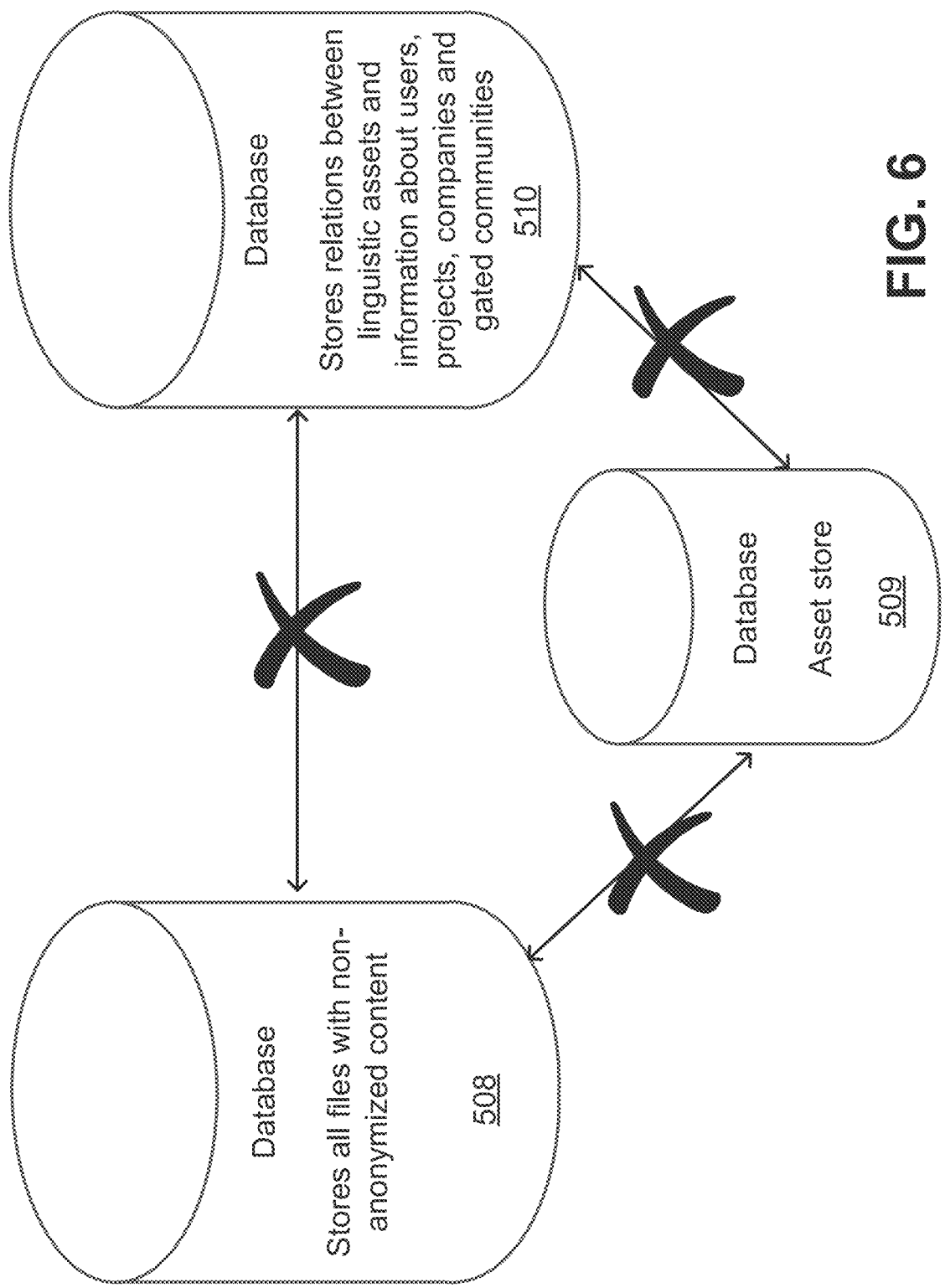
FIG. 6 is diagram illustrating relationships between databases of a system for implementing an automation-enhanced workflow.

Database 507 can have an object storage architecture, storing non-volatile files (e.g., photos, non-disclosure agreements [NDAs], etc.). Database 508 can have an object storage architecture, storing files with non-anonymized content (e.g., confidential source content that was redacted during an anonymization process). In some implementations, the data stored in database 508 is available only to requestors 202 who provided the underlying confidential data and/or to authorized parties. Database 509 can be an object database and can serve as an asset store, storing linguistic assets. The database 509 can be optimized for searching and can be configured to store only texts of anonymized linguistic assets. Database 510 is the primary database of the system 500 and can be a relational database that stores relations between linguistic assets and information about users, projects, companies, and gated communities. Referring briefly to FIG. 6, the databases 508, 509, 510 are separated into distinct data stores to protect the confidentiality of the stored data. Therefore, data is not allowed to flow freely between these databases.

Referring again to FIGS. 5A-5C, the workflow application 503 is also in communication with a messaging system service 511 that operates a messaging queue. Via the messaging queue, the workflow application 503 is able to communicate with the asset store service 504, the blockchain service 505, an OCR service 517, an anonymizer service 518, a notifications service 519, and a BI API service 520.

The asset store service 504 is dedicated for machine translation of files and preparation of output files. The asset store service 504 can access data from the databases 508, 509, 510 to perform its operations. For example, as described above in relation to FIG. 3, the asset store service 504 can check to see if assets exist in the asset store (e.g., database 509), send linguistic assets to MT engines, prepare a xliff file with translations, and merge the xliff file with another file to create a translated output file. Referring again to FIGS. 5A-5C, the MT engines that the asset store service 504 sends linguistic assets to can include Google Translate 512, Amazon Translate 513, Azure Translator 514, and IQVIA translation API 515.

The blockchain service 505 prepares requests to a blockchain and stores, on the blockchain, cryptocurrency (e.g., XFL) transactions for completing tasks and metadata about linguistic assets and performance metrics associated with various service providers. To conduct these operations, the blockchain service 505 can send data to a third-party blockchain platform such as Ethereum 516. The blockchain is utilized to form an immutable ledger of a reputation for each service provider. This ledger helps to ensure that an appropriate service provider in a given field and for a given language pair is matched with the content and language pair of a particular task. For instance, a blockchain record for a given service provider includes parameters such as a quality score for the revised or enhanced linguistic content generated by the service provider, a skill taxonomy of the linguistic content, the number of linguistic assets processed by the service provider, or an indication of timeliness of the revised or enhanced linguistic content. The blockchain based approaches described here are personal, immutable, and specific to a given combination of languages (a language pair) and skills. Via the immutable ledger of linguistic performance, service providers are furnished with the opportunity to acquire an incontrovertible reputation. Accordingly, the requester can trust that an appropriate linguistic content enhancer can be matched to any given translation-related assignment. Additional information about taxonomy graphs is provided in co-pending application U.S. patent application Ser. No. 17/728,460, the contents of which are incorporated here by reference in their entirety.

The OCR service 517 converts source content to machine-readable text, for example, in PDF files. For example, the OCR service 517 can perform the OCR 106 described above in relation to FIG. 1. In some implementations, the OCR service 517 may not perform OCR itself, but may determine that OCR is appropriate and send a file to an external OCR service (e.g., via OCR API 521) to obtain a file with machine-readable text, as described above in relation to FIG. 2A. As it performs these tasks, the OCR service 517 can access databases 508, 509.

The anonymizer service 518 receives text and anonymizes it. For example, the anonymizer service 518 can perform at least a portion of the anonymization process 108 described above in relation to FIG. 1. The anonymizer service 518 can also be the service that receives files sent for automated anonymization when it is determined that automated anonymization is appropriate, as described above in relation to FIG. 2A. As it performs these tasks, the anonymizer service provider 518 can access databases 508, 509. In some implementations, the anonymizer service 518 can also be responsible for de-anonymizing files by replacing redacted content with their original corresponding text. The anonymizer service 518 is described in further detail herein with respect to FIGS. 7 and 8.

The notifications service 519 sends notifications to users and can access the database 510 to do so. For example, the notifications service 519 can handle the notifications to a requestor (e.g., requestor 202) indicating that a job is finished, as described above in relation to FIGS. 2B-2D. In some implementations, the notifications service 519 can also send notifications to service providers about requests to take on new jobs and requests to make corrections in scenarios where a requestor rejects an output file and sends it back to the service provider.

The BI API service 520 is an application that reads and writes data to and from a data warehouse 521.

In some implementations, the system 500 can further include a logs gathering application 522 that gathers logs from the workflow application 503, the asset store service 504, and the blockchain service 505. The logs can be stored on a database 523 (e.g., an object database). These logs can in turn be accessed by a visualization application 524 for monitoring, visualizing, and analyzing the logs.

In some implementations, the system 500 can include or interface with other external services. For example, the single-page application 502 may interface with a chat service for providing chat functionality to users of the system 500 or with a WebDAV service for handling workflows. In another example, the workflow application 503 can communicate with a business intelligence service such as Hadoop to create reports. In yet another example, the workflow application 503 can communicate with a file conversion service to convert source files and output files to various file types. These examples are illustrative and not intended to be limiting.

Figure 7:
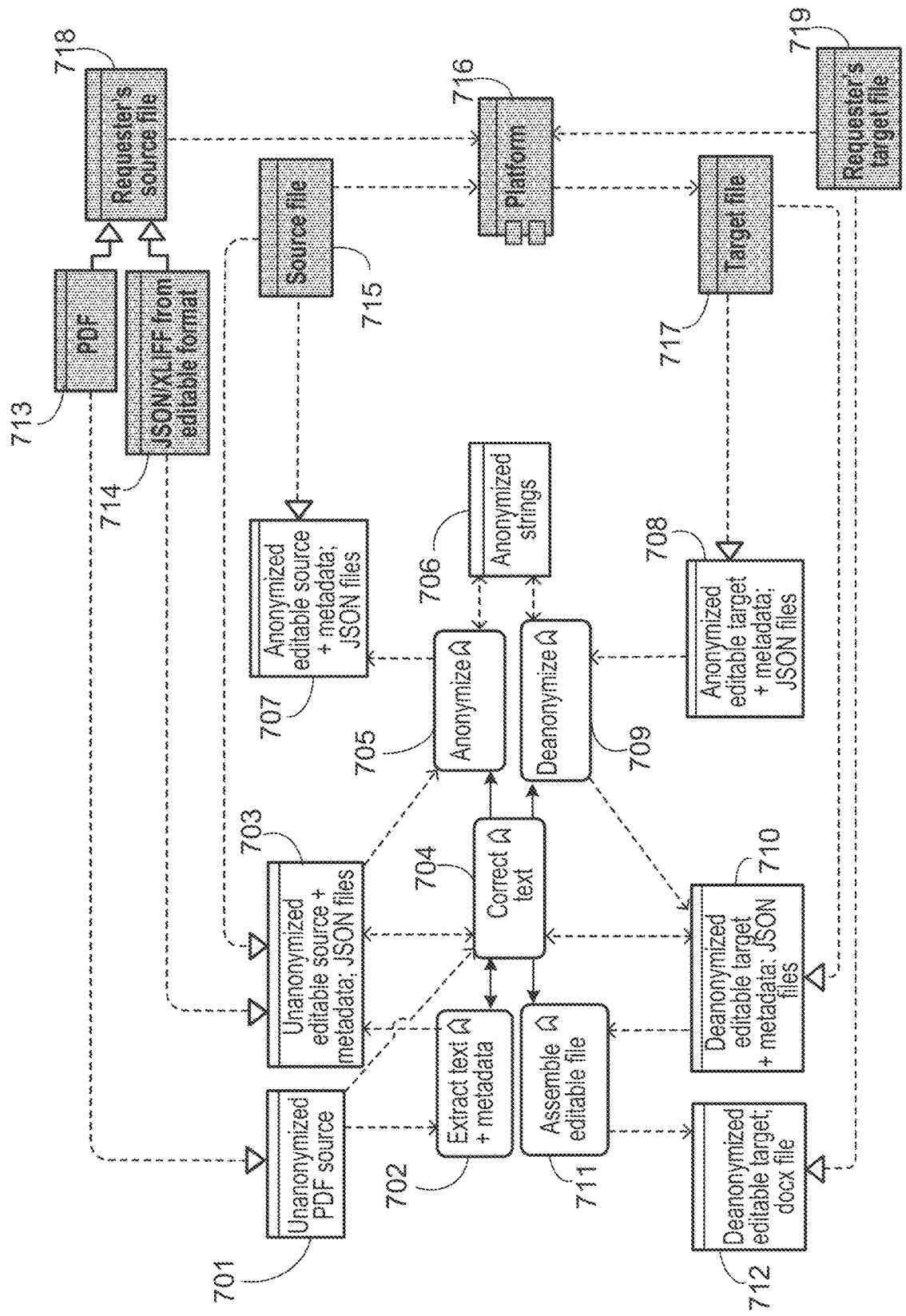
FIGS. 7-8 are diagrams illustrating a system architecture for anonymizing and de-anonymizing digital files.
Figure 8:
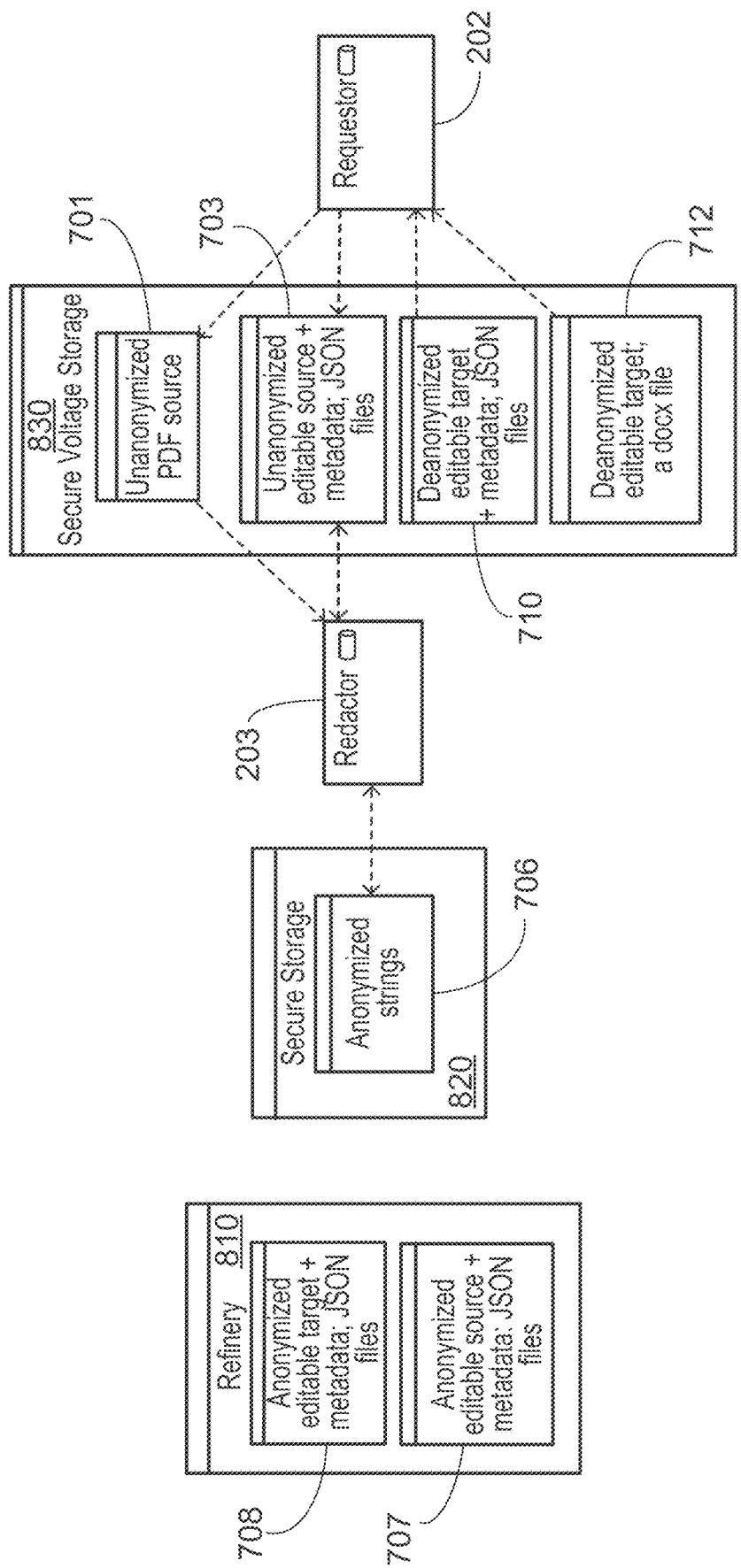

FIGS. 7 and 8 show a system architecture for anonymizing and de-anonymizing digital files. For example, the system architecture can be implemented to perform the anonymization process 108 and the de-anonymization process 122 described above in relation to FIG. 1. The system architecture is shown using an Archimate Business Process Cooperation Viewpoint and can be implemented, at least in part, by the anonymizer service 518, described above in relation to FIGS. 5A-5C. Shapes depicted as empty white boxes represent objects (e.g., files) and functions involved directly in anonymizing and de-anonymizing digital files while shapes depicted in dot-filled gray boxes represent other features of the system architecture. Referring to FIG. 7, an unanonymized source PDF file 701 can be uploaded by a requestor (e.g., requestor 202) to a file-processing platform (e.g., platform 104 or system 201). The file can include a set of pages in a form of bitmaps stored as a multi-page PDF. Since file 701 is a PDF, "PDF" data object 713 (used for integration with other portions of the system architecture)

can be described as realizing the file 701. The file 701 is processed by an "extract text+metadata" function 702, which creates an unanonymized source file in a digital format with metadata 703. More specifically, the "unanonymized editable source+metadata" 703 output by the function 702 can be more one or more JSON files containing machine-readable, unanonymized text as well as information regarding the text's formatting, language, distribution in the layout, etc. "JSON from editable format" data object 714 thus realizes the "unanonymized editable source+metadata" 703. In some implementations, the "unanonymized editable source+metadata" 703 can also be used as a source file. In other words, "Source file" data object 715 can realize the "unanonymized editable source+metadata" 703 and can be uploaded to the platform 716 for processing.

The "unanonymized editable source+metadata" 703 is loaded to the "correct text" function 704, which is a core feature used by redactors (e.g., redactor 203) to edit source text to perform anonymization (e.g., at the manual redaction step 112). In particular, the function 704 enables a redactor to interactively undertake two objectives in the same workflow. First, the function 704 enables the redactor to correct any mistakes that might have occurred as a result of the "extract text+metadata" function 702. The "correct text" function 704 can include on-demand recognition capabilities of a selected rectangular area in a page of the unanonymized PDF source 701. Second, the function 704 enables the redactor to check and augment the results of an "anonymize" function 705.

The "anonymize" function 705 processes the "unanonymized editable source+metadata" 703, automatically detecting strings to be anonymized in the source content. Identification is based, first on running the text through a "Named Entity Recognition" process, and second by checking against previously tokenized "anonymized strings" 706, which can be subsequently and interactively updated in this process. These "anonymized strings" 706 are both source and target language sensitive, and they can correspond to original, confidential text that was redacted in previous anonymization processes.

The Named Entity Recognition process can include a machine learning algorithm that identifies and tags confidential information with categorical labels, as described above in relation to FIG. 1. In some implementations the machine learning algorithm can be retrained and/or updated periodically (e.g., daily, weekly, etc.), utilizing new training examples of manual redaction outputs to improve the quality of automatically-generated redacted outputs. In some implementations, a separate machine learning model for anonymization can be trained for each combination of domain name (e.g., finance, medicine, automotive, law, sport, lifestyle, culture, etc.) and language code. This can have the advantage of tailoring automatically-generated anonymized outputs for specific use cases. For example, while it may be desirable to anonymize the word "jaguar" within an "Automotive" domain (since Jaguar refers to a vehicle brand name), it may not be desirable to anonymize the word "jaguar" within an "Animal" domain (e.g., in a file about cat species).

The anonymized output of the "anonymize" function 705 is stored as "anonymized editable source+metadata" 707, which is then used throughout other portions of the workflow (e.g., workflows 100, 200) implemented by the file-processing platform. For example, the platform can take the "anonymized editable source+metadata" 707, and translate it via a translation process such as translation process 114. In some implementations, the "editable source+metadata" can be one or more JSON files. In some implementations, the "anonymized editable source+metadata" 707 can be a used as a source file in the platform 716, with "Source file" data object 715 realizing the "anonymized editable source+metadata" 707. The "anonymized editable source+metadata" 707 can include machine-readable, anonymized text as well as information regarding the text's formatting, language, distribution in the layout, anonymization information, etc.

After the translation process is concluded, the platform produces "anonymized editable target+metadata" 708. A "deanonymize" function 709 combines the "anonymized editable target+metadata" 708 with the "anonymized strings" 706 to generate "deanonymized editable target+metadata" 710. In some implementations, the "anonymized editable target+metadata" 708 and/or the "deanonymized editable target+metadata" 710 can be one or more JSON files, They can contain machine-readable text as well as information regarding the text's formatting, language, distribution in the layout, anonymization information (if applicable), etc. An "assemble editable file" function 711 can then use the "deanonymized editable target+metadata" 710 to generate a "deanonymized editable target" 712. The "deanonymized editable target" 712 is a deanonymized and translated file that can be returned to the requestor to complete the workflow.

"Target file" data object 717 is a data object representing the results of the translation process. In some workflows, where anonymization is performed, the "Target file" data object 717 realizes the "anonymized editable target+metadata" 708. In some workflows, where anonymization is not performed, then the "Target file" data object 717 realizes the "deanonymized editable target+metadata" 710.

The system architecture can further include a "Requestor's source file" data object 718 and/or a "Requestor's target file" data object 719, which can be distinct from the "Source file" data object 715 and the "Target file" data object 717. For example, while a "Requestor's source file" data object 718 is realized by a file that is uploaded to the platform 716 by a requestor for processing, the "Source file" data object 715 can be an internal editable and segmented representation of that uploaded file within the platform 716. Analogously, while a "Requestor's target file" data object 719 is realized by a file that a requestor can download from the platform 716, the "Target file" data object 717 can be an internal editable and segmented representation of that downloadable file within the platform 716.

FIG. 8 shows the system architecture for anonymizing and de-anonymizing digital files with a focus on data storage and service provider roles. As shown in FIG. 8, there are three classes of storage for the text data, files, and metadata involved in anonymization and de-anonymization processes. The first class of storage is the refinery 810, which stores anonymized data in the form of "anonymized editable source+metadata" 707 and "anonymized editable target+metadata" 708.

The other two classes of storage are secure storage 820 and secure volatile storage 830. These two classes of storage provide storage with elevated security for unanonymized data and anonymized strings 706. The secure storage 820 aggregates anonymized strings 706 and stores them in persistent storage. The secure storage 820 grows over time as the platform encounters new anonymized strings containing confidential information identified for redaction. The secure volatile storage 830, on the other hand, is not persistent. It aggregates all unanonymized data (e.g., "unanonymized PDF source" 701, "unanonymized source+metadata" 703, "deanonymized editable target+metadata" 710, and "deanonymized editable target" 712), but this data is removed permanently after delivering the deanonymized and translated target file to the requester 202.

Both the redactor 203 and the requester 202 have access to business objects stored in the secure storage 820 and the secure volatile storage 830, with the arrows in FIG. 8 representing possible data flows. However, unlike the redactor 203 and the requester 202, enhancers and trust miners (not shown) are unable to access any unanonymized data unless a requestor authorizes them to do so. Instead, enhancers and trust miners, who are uninvolved in anonymization and deanonymization processes, work exclusively with anonymized data (e.g., "anonymized editable target+metadata" 708, "anonymized editable source+metadata" 707) stored in the refinery 810. The enhancers and trust miners are also able to build upon the refinery 810, storing additional data as translations are completed.

Figure 9:
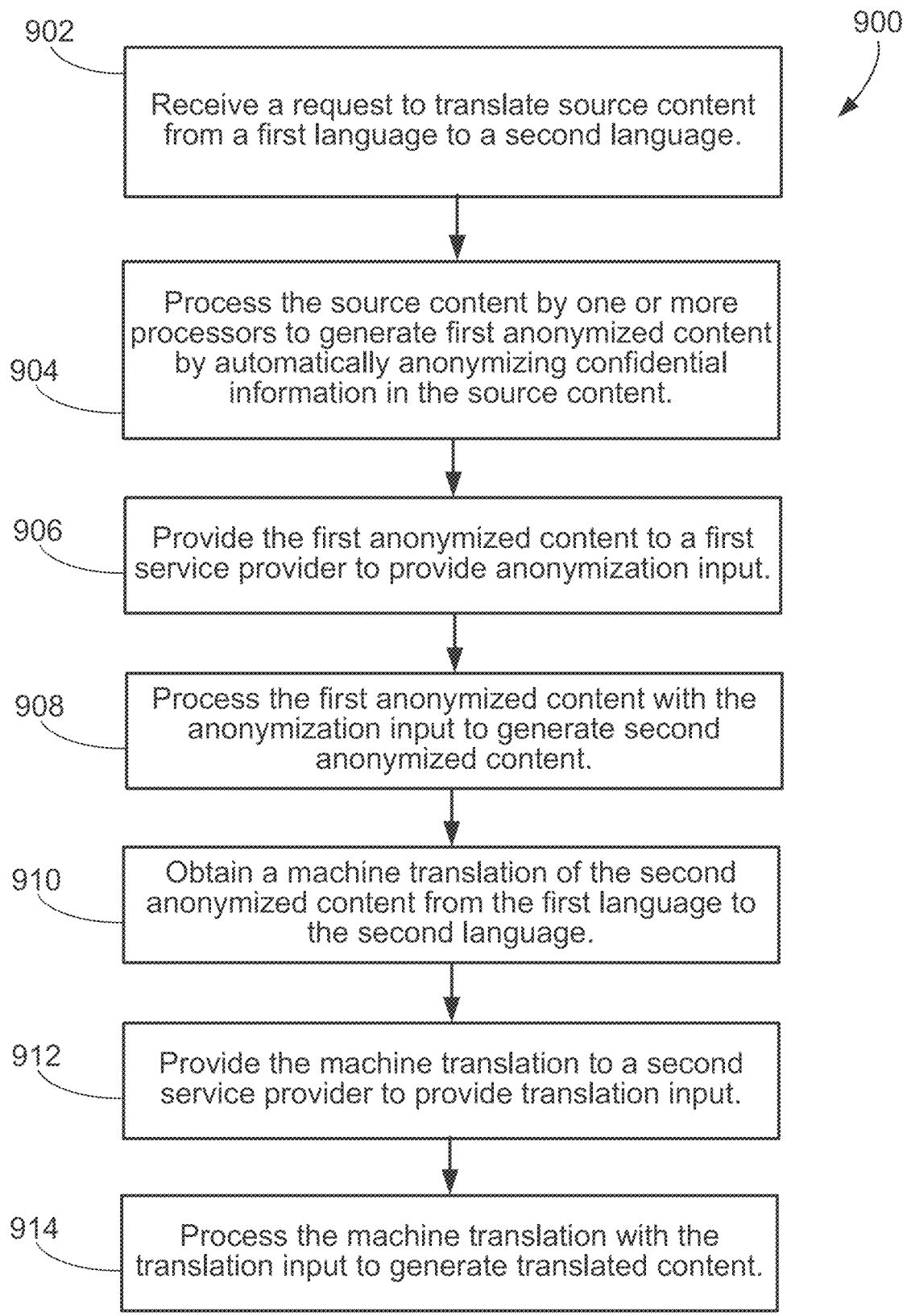
FIG. 9 is a flowchart of a process for generating translated content.

FIG. 9 illustrates an example process 900 for generating translated content. Operations of the process 900 can be executed by a system such as systems 201, 500 or by platform 104.

Operations of the process 900 include receiving a request to translate source content from a first language to a second language (902). For example, the first language can be a source language and the second language can be a target language for translation.

Operations of the process 900 also include processing the source content by one or more processors to generate first anonymized content by automatically anonymizing confidential information in the source content (904). For example, generating the first anonymized content can correspond to the automated redaction process 110 described above in relation to FIG. 1. Processing the source content to generate the first anonymized content can include replacing the confidential information in the source content with metadata indicative of a category of the replaced confidential information.

Operations of the process 900 also include providing the first anonymized content to a first service provider to provide anonymization input (906) and processing the first anonymized content with the anonymization input to generate second anonymized content (908). For example, the first service provider can be a human redactor such as redactor 203. The redactor can provide feedback that is used in a manual redaction process (e.g., manual redaction process 112) to produce the second anonymized output.

Operations of the process 900 also include obtaining a machine translation of the second anonymized content from the first language to the second language (910). For example, obtaining the machine translation can correspond to the machine translation step 116 described above in relation to FIG. 1 and/or step 218 described in relation to FIG. 2B and FIG. 3 above. Obtaining the machine translation of the second anonymized content comprises can include accessing a data storage element (e.g., a linguistic asset store) and recycling one or more portions of previously translated text (e.g., one or more assets) stored in the data storage element. Obtaining the machine translation of the second anonymized content can include (i) sending a portion of the second anonymized content to multiple translation engines and (ii) evaluating outputs from the multiple translation engines to determine which of the outputs to use in the machine translation. In some cases, evaluating the outputs from the multiple translation engines can include calculating a similarity metric (e.g., a Levenshtein distance) between pairs of the outputs, as described above.

Operations of the process 900 also include providing the machine translation to a second service provider to provide translation input (912) and processing the machine translation with the translation input to generate translated content (914). For example, the second service provider can be a human translator such as enhancer 204. The enhancer can provide feedback that is used in a translation enhancement process (e.g., enhancement process 118) to produce the translated output.

Operations of the process 900 can optionally include converting by one or more processors at least a portion of the source content to machine-readable text (e.g., using OCR 106). Operations of the process 900 can optionally include providing the second anonymized content to a third service provider to evaluate an anonymization quality of the second anonymized content and/or providing the translated content to a third service provider to evaluate a translation quality of the translated content. For example, the third service provider can be a trust miner (e.g., trust miner 205) who can participate in a trust mining process (e.g., trust mining step 120). Operations of the process 900 can optionally include storing data indicative of the translation quality of the translated content in relation to data representing an identity of the second service provider. For example, the data indicative of the translation quality of the translated content can be stored on a blockchain. Operations of the process 900 can optionally include dynamically updating a process for automatically anonymizing subsequent confidential information based on the anonymization input provided by the first service provider. Operations of the process 900 can optionally include dynamically updating a process for obtaining subsequent machine translations based on the translation input provided by the second service provider. Operations of the process 900 can optionally include storing one or more translated portions of the translated content (e.g., linguistic assets) in a data storage element.

Figure 10:
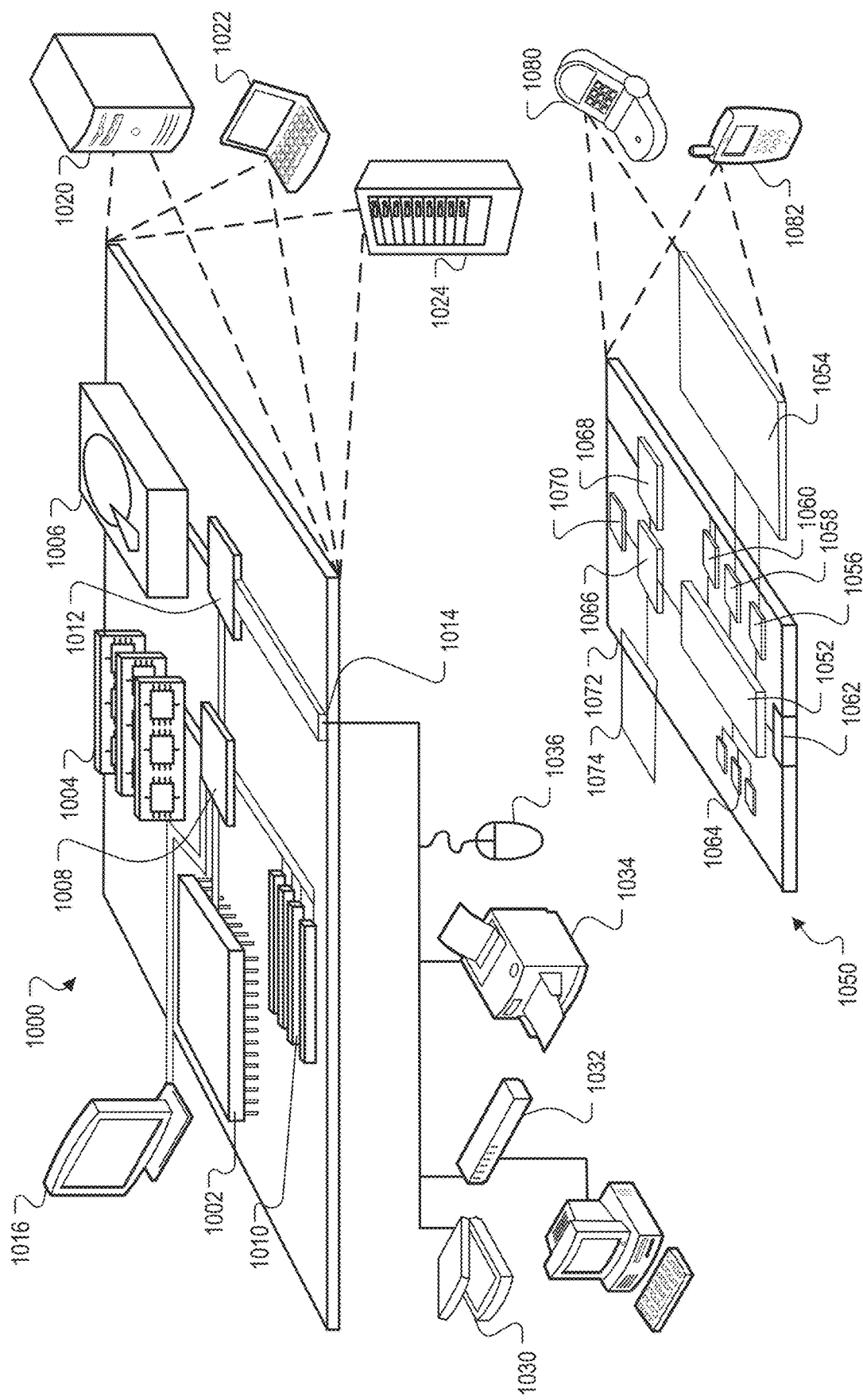
FIG. 10 is a diagram illustrating an example of a computing environment.

FIG. 10 shows an example of a computing device 1000 and a mobile computing device 1050 that are employed to execute implementations of the present disclosure. The computing device 1000 is intended to represent various forms of digital computers, such as laptops, desktops, workstations, personal digital assistants, servers, blade servers, mainframes, and other appropriate computers. The mobile computing device 1050 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. The computing device 1000 and/or the mobile computing device 1050 can form at least a portion of the systems described above (e.g., platform 104, system 201, system 500).

The computing device 1000 includes a processor 1002, a memory 1004, a storage device 1006, a high-speed interface 1008, and a low-speed interface 1012. In some implementations, the high-speed interface 1008 connects to the memory 1004 and multiple high-speed expansion ports 1010. In some implementations, the low-speed interface 1012 connects to a low-speed expansion port 1014 and the storage device 1004. Each of the processor 1002, the memory 1004, the storage device 1006, the high-speed interface 1008, the high-speed expansion ports 1010, and the low-speed interface 1012, are interconnected using various buses, and may be mounted on a common motherboard or in other manners as appropriate. The processor 1002 can process instructions for execution within the computing device 1000, including instructions stored in the memory 1004 and/or on the storage device 1006 to display graphical information for a graphical user interface (GUI) on an external input/output device, such as a display 1016 coupled to the high-speed interface 1008. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 1004 stores information within the computing device 1000. In some implementations, the memory 1004 is a volatile memory unit or units. In some implementations, the memory 1004 is a non-volatile memory unit or units. The memory 1004 may also be another form of a computer-readable medium, such as a magnetic or optical disk.

The storage device 1006 is capable of providing mass storage for the computing device 1000. In some implementations, the storage device 1006 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 1002, perform one or more methods, such as those described above. The instructions can also be stored by one or more storage devices, such as computer-readable or machine-readable mediums, such as the memory 1004, the storage device 1006, or memory on the processor 1002.

The high-speed interface 1008 manages bandwidth-intensive operations for the computing device 1000, while the low-speed interface 1012 manages lower bandwidth-intensive operations. Such allocation of functions is an example only. In some implementations, the high-speed interface 1008 is coupled to the memory 1004, the display 1016 (e.g., through a graphics processor or accelerator), and to the high-speed expansion ports 1010, which may accept various expansion cards. In the implementation, the low-speed interface 1012 is coupled to the storage device 1006 and the low-speed expansion port 1014. The low-speed expansion port 1014, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 1014 through a network adapter. Such network input/output devices may include, for example, a switch or router.

The computing device 1000 may be implemented in a number of different forms, as shown in the FIG. 10. For example, it may be implemented as a standard server 1020, or multiple times in a group of such servers. In addition, it may be implemented in a personal computer such as a laptop computer 1022. It may also be implemented as part of a rack server system 1024. Alternatively, components from the computing device 1000 may be combined with other components in a mobile device, such as a mobile computing device 1050. Each of such devices may contain one or more of the computing device 1000 and the mobile computing device 1050, and an entire system may be made up of multiple computing devices communicating with each other.

The mobile computing device 1050 includes a processor 1052; a memory 1064; an input/output device, such as a display 1054; a communication interface 1066; and a transceiver 1068; among other components. The mobile computing device 1050 may also be provided with a storage device, such as a micro-drive or other device, to provide additional storage. Each of the processor 1052, the memory 1064, the display 1054, the communication interface 1066, and the transceiver 1068, are interconnected using various buses, and several of the components may be mounted on a common motherboard or in other manners as appropriate. In some implementations, the mobile computing device 1050 may include a camera device(s).

The processor 1052 can execute instructions within the mobile computing device 1050, including instructions stored in the memory 1064. The processor 1052 may be implemented as a chipset of chips that include separate and multiple analog and digital processors. For example, the processor 1052 may be a Complex Instruction Set Computers (CISC) processor, a Reduced Instruction Set Computer (RISC) processor, or a Minimal Instruction Set Computer (MISC) processor. The processor 1052 may provide, for example, for coordination of the other components of the mobile computing device 1050, such as control of user interfaces (UIs), applications run by the mobile computing device 1050, and/or wireless communication by the mobile computing device 1050.

The processor 1052 may communicate with a user through a control interface 1058 and a display interface 1056 coupled to the display 1054. The display 1054 may be, for example, a Thin-Film-Transistor Liquid Crystal Display (TFT) display, an Organic Light Emitting Diode (OLED) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may provide communication with the processor 1052, so as to enable near area communication of the mobile computing device 1050 with other devices. The external interface 1062 may provide, for example, for wired communication in some implementations, or for wireless communication in other implementations, and multiple interfaces may also be used.

The memory 1064 stores information within the mobile computing device 1050. The memory 1064 can be implemented as one or more of a computer-readable medium or media, a volatile memory unit or units, or a non-volatile memory unit or units. An expansion memory 1074 may also be provided and connected to the mobile computing device 1050 through an expansion interface 1072, which may include, for example, a Single in Line Memory Module (SIMM) card interface. The expansion memory 1074 may provide extra storage space for the mobile computing device 1050, or may also store applications or other information for the mobile computing device 1050. Specifically, the expansion memory 1074 may include instructions to carry out or supplement the processes described above, and may include secure information also. Thus, for example, the expansion memory 1074 may be provided as a security module for the mobile computing device 1050, and may be programmed with instructions that permit secure use of the mobile computing device 1050. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 1052, perform one or more methods, such as those described above. The instructions can also be stored by one or more storage devices, such as one or more computer-readable or machine-readable mediums, such as the memory 1064, the expansion memory 1074, or memory on the processor 1052. In some implementations, the instructions can be received in a propagated signal, such as, over the transceiver 1068 or the external interface 1062.

The mobile computing device 1050 may communicate wirelessly through the communication interface 1066, which may include digital signal processing circuitry where necessary. The communication interface 1066 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 1068 using a radio frequency. In addition, short-range communication, such as using a Bluetooth or Wi-Fi, may occur. In addition, a Global Positioning System (GPS) receiver module 1070 may provide additional navigation- and location-related wireless data to the mobile computing device 1050, which may be used as appropriate by applications running on the mobile computing device 1050.

The mobile computing device 1050 may also communicate audibly using an audio codec 1060, which may receive spoken information from a user and convert it to usable digital information. The audio codec 1060 may likewise generate audible sound for a user, such as through a speaker, e.g., in a handset of the mobile computing device 1050. Such sound may include sound from voice telephone calls, may include recorded sound (e.g., voice messages, music files, etc.) and may also include sound generated by applications operating on the mobile computing device 1050.

The mobile computing device 1050 may be implemented in a number of different forms, as shown in FIG. 10. For example, it may be implemented in a phone device 1080, a personal digital assistant 1082, and a tablet device (not shown). The mobile computing device 1050 may also be implemented as a component of a smart-phone, AR device, or other similar mobile device.

The computing device 1000 may be implemented in the systems described above with respect to FIGS. 1-11 (e.g., the platform 104 and the systems 201, 500).

Computing device 1000 and/or 1050 can also include USB flash drives. The USB flash drives may store operating systems and other applications. The USB flash drives can include input/output components, such as a wireless transmitter or USB connector that may be inserted into a USB port of another computing device.

Other embodiments and applications not specifically described herein are also within the scope of the following claims. Elements of different implementations described herein may be combined to form other embodiments.

What is claimed is:

1. A method comprising:
   receiving, by one or more processors, a request to translate source content from a first language to a second language;
   processing, by the one or more processors, the source content using a machine learning model to generate first anonymized content by automatically removing confidential information in the source content;
   providing, by the one or more processors, the first anonymized content to a first service provider to provide anonymization input, the first service provider selected based on a metric indicative of past performance of one or more redaction tasks;
   processing, by the one or more processors, the first anonymized content with the anonymization input to generate second anonymized content;
   obtaining, by the one or more processors, a machine translation of the second anonymized content from the first language to the second language;
   providing, by the one or more processors, the machine translation to a second service provider to provide translation input, the second service provider selected based on a metric indicative of past performance of one or more translation tasks; and
   processing, by the one or more processors, the machine translation with the translation input to generate translated content.

2. The method of claim 1, comprising converting by one or more processors at least a portion of the source content to machine-readable text.

3. The method of claim 1, comprising providing the second anonymized content to a third service provider to evaluate an anonymization quality of the second anonymized content.

4. The method of claim 1, comprising providing the translated content to a third service provider to evaluate a translation quality of the translated content.

5. The method of claim 4, comprising storing data indicative of the translation quality of the translated content in relation to data representing an identity of the second service provider.

6. The method of claim 5, wherein storing the data indicative of the translation quality of the translated content comprises storing the data indicative of the translation quality on a blockchain.

7. The method of claim 1, comprising dynamically updating a process for automatically removing subsequent confidential information based on the anonymization input provided by the first service provider.

8. The method of claim 1, comprising dynamically updating a process for obtaining subsequent machine translations based on the translation input provided by the second service provider.

9. The method of claim 1, wherein processing the source content to generate the first anonymized content comprises replacing the confidential information in the source content with metadata indicative of a category of the replaced confidential information.

10. The method of claim 1, comprising storing one or more translated portions of the translated content in a data storage element.

11. The method of claim 1, wherein obtaining the machine translation of the second anonymized content comprises:
    accessing a data storage element; and
    recycling one or more portions of previously translated text stored in the data storage element.

12. The method of claim 1, wherein obtaining the machine translation of the second anonymized content comprises:

sending a portion of the second anonymized content to multiple translation engines; and
evaluating outputs from the multiple translation engines to determine which of the outputs to use in the machine translation.

13. The method of claim 12, wherein evaluating the outputs from the multiple translation engines comprises calculating a similarity metric between pairs of the outputs.

14. The method of claim 1, further comprising training, for combinations of domain type data in the first anonymized content, a second machine learning model to generate data that tags confidential information in the source content.

15. The method of claim 1, wherein the first service provider and the second service provider are distinct service providers.

16. The method of claim 1, wherein at least one of the metric indicative of past performance of one or more redaction tasks or the metric indicative of past performance of one or more translation tasks is associated with a demonstrated skillset for working with documents involving a particular subject matter.

17. The method of claim 1, wherein the metric indicative of past performance of one or more translation tasks is associated with a demonstrated skillset for translating between particular languages.

18. The method of claim 1, wherein the metric indicative of past performance of one or more translation tasks is associated with a translation speed and/or the metric indicative of past performance of one or more redaction tasks is associated with a translation speed.

19. A computing system comprising one or more processors coupled to a memory, the processors and the memory configured to:
receive a request to translate source content from a first language to a second language;
process the source content using a machine learning model to generate first anonymized content by automatically removing confidential information in the source content;
provide the first anonymized content to a first service provider to provide anonymization input, the first service provider selected based on a metric indicative of past performance of one or more redaction tasks;
process the first anonymized content with the anonymization input to generate second anonymized content;
obtain a machine translation of the second anonymized content from the first language to the second language;
provide the machine translation to a second service provider to provide translation input, the second service provider selected based on a metric indicative of past performance of one or more translation tasks; and
process the machine translation with the translation input to generate translated content.

20. The computing system of claim 19, wherein the processors and the memory are further configured to convert at least a portion of the source content to machine-readable text.

21. The computing system of claim 19, wherein the processors and the memory are further configured to provide the translated content to a third service provider to evaluate a translation quality of the translated content.

22. The computing system of claim 21, wherein the processors and the memory are further configured to store data indicative of the translation quality of the translated content in relation to data representing an identity of the second service provider.

23. The computing system of claim 19, wherein the processors and the memory are further configured to dynamically update a process for automatically removing subsequent confidential information based on the anonymization input provided by the first service provider.

24. The computing system of claim 19, wherein the processors and the memory are further configured to dynamically update a process for obtaining subsequent machine translations based on the translation input provided by the second service provider.

25. The computing system of claim 19, wherein processing the source content to generate the first anonymized content comprises replacing the confidential information in the source content with metadata indicative of a category of the replaced confidential information.

26. The computing system of claim 19, wherein the processors and the memory are further configured to store one or more translated portions of the translated content in a data storage element.

27. The computing system of claim 19, wherein obtaining the machine translation of the second anonymized content comprises:
accessing a data storage element; and
recycling one or more portions of previously translated text stored in the data storage element.

28. The computing system of claim 19, wherein obtaining the machine translation of the second anonymized content comprises:
sending a portion of the second anonymized content to multiple translation engines; and
evaluating outputs from the multiple translation engines to determine which of the outputs to use in the machine translation.

29. A non-transitory computer readable medium storing instructions that are executable by a processing device, and upon such execution cause the processing device to perform operations comprising:
receiving, by one or more processors, a request to translate source content from a first language to a second language;
processing, by the one or more processors, the source content using a machine learning model to generate first anonymized content by automatically removing confidential information in the source content;
providing, by the one or more processors, the first anonymized content to a first service provider to provide anonymization input, the first service provider selected based on a metric indicative of past performance of one or more redaction tasks;
processing, by the one or more processors, the first anonymized content with the anonymization input to generate second anonymized content;
obtaining, by the one or more processors, a machine translation of the second anonymized content from the first language to the second language;
providing, by the one or more processors, the machine translation to a second service provider to provide translation input, the second service provider selected based on a metric indicative of past performance of one or more translation tasks; and
processing, by the one or more processors, the machine translation with the translation input to generate translated content.

* * * * *